United States Patent [19]
Alleva

[11] Patent Number: 5,758,024
[45] Date of Patent: May 26, 1998

[54] METHOD AND SYSTEM FOR ENCODING PRONUNCIATION PREFIX TREES

[75] Inventor: Fileno A. Alleva, Redmond, Wash.

[73] Assignee: Microsoft Corporation, Redmond, Wash.

[21] Appl. No.: 674,656

[22] Filed: Jun. 25, 1996

[51] Int. Cl.$^6$ .................................................. G10L 9/00
[52] U.S. Cl. .......................................... 395/2.63; 395/264
[58] Field of Search ............................. 395/2.6, 2.63, 395/2.64, 2.65

[56] References Cited

U.S. PATENT DOCUMENTS

| | | | |
|---|---|---|---|
| 5,329,608 | 7/1994 | Bocchieri et al. | 395/2.52 |
| 5,454,062 | 9/1995 | La Rue | 395/2.63 |
| 5,528,728 | 6/1996 | Matsuura et al. | 395/2.41 |
| 5,535,305 | 7/1996 | Acero et al. | 395/2.65 |

OTHER PUBLICATIONS

Aubert, X. et al., "Large Vocabulary Continuous Speech Recognition of Wall Street Journal Data," in *Proceedings of the IEEE ICASSP*, Adelaide, South Australia, 1994, pp. 129–132.

Huang, X., et al., "From SPHINX-II to Whisper—Making Speech Recognition Usable," *Speech and Speaker Recognition–Advanced Topics*, Kulwer Publisher, 1994, pp. 481–508.

Odell, J., et al., "A One Pass Decoder Design for Large Vocabulary Recognition," in *Proceedings of the ARPA HLT Workshop*, Plainsboro, NJ, 1994, pp. 405–410.

Ney, H., et al., IEEE Signal Processing Society: 1992 International Conference on Acoustics, Speech, and Signal Processing, "*Improvements in Beam Search for 10000-Word Continuous Speech Recognition*," San Francisco Marriott Hotel, San Francisco, California, Mar. 23–26, 1992, vol. 1, pp. I-9–I-12.

Ney, Hermann, Eurospeech 1993: Third European Conference on Speech Communication and Technology, "*Modeling and Search in Continuous Speech Recognition*," Berlin, Germany, Sep. 21–23, vol. 1, pp. 491–498.

(List continued on next page.)

*Primary Examiner*—Allen R. MacDonald
*Assistant Examiner*—Susan Wieland
*Attorney, Agent, or Firm*—Seed and Berry LLP

[57] ABSTRACT

A computer system for linearly encoding a pronunciation prefix tree. The pronunciation prefix tree has nodes such that each non-root and non-leaf node represents a phoneme and wherein each leaf node represents a word formed by the phonemes represented by the non-leaf nodes in a path from the root node to the leaf node. Each leaf node has a probability associated with the word of the leaf node. The computer system creates a tree node dictionary containing an indication of the phonemes that compose each word. The computer system then orders the child nodes of each non-leaf node based on the highest probability of descendent leaf nodes of the child node. Then, for each non-leaf node, the computer system sets the probability of the non-leaf node to a probability based on the probability of its child nodes, and for each node, sets a factor of the node to the probability of the node divided by the probability of the parent node of the node. Finally, the computer system generates an encoded pronunciation entry for each leaf node of the pronunciation prefix tree. Each encoded pronunciation entry indicates the word represented by the leaf node and contains the factor of a nearest ancestor node with a factor other than 1.0.

65 Claims, 19 Drawing Sheets

OTHER PUBLICATIONS

Woodland, P.C., et al., ICASSP 1994: 1994 International Conference on Acoustics, Speech and Signal Processing, "*Large Vocabulary Continuous Speech Recognition Using HTK*," Adelaide Convention Centre, Adelaide, South Australia, Apr. 19–22, 1994, vol. 2, Speech Processing 2 Audio, Underwater Acoustics, VLSI and Neural Networks, pp. II–125–II–128.

Alleva, Fil et al., 1993 IEEE International Conference on Acoustics, Speech, and Signal Processing, "*An Improved Search Algorithm Using Incremental Knowledge for Continuous Speech Recognition*," Minneapolis Convention Center, Minneapolis, Minnesota, Apr. 27–30, 1993, Speech Processing vol. II of V, pp. II–307–II–310.

Antoniol, Giuliano, The Signal Processing Society of The Institute of Electrical and Electronics Engineers: The 1995 International Conference on Acoustics, Speech, and Signal Processing, "*Language Model Representations for Beam-Search Decoding*," Westin Hotel, Detroit, Michigan, May 9–12, 1995, Conference Proceedings, vol. 1: Speech, p. 588–591.

Nilson, Nils J., "*Problem–Solving Methods in Artificial Intelligence: Chapter Five, Problem–Reduction Search Methods*," Artificial Intelligence Group, Stanford Research Institute, Menlo Park, California, 1971, pp. 116–155.

Phonetic Dictionary

| Word | Pronunciation | Unigram Probability |
|---|---|---|
| CAUGHT | K AW T | .2 |
| COTTON | K AW T EN | .1 |
| WE | W IY | .3 |
| WEAR | W AXR | .25 |
| WERE | W ER | .15 |

*Fig. 1A*

Context-dependent Probabilities

| Sequence | | Probability |
|---|---|---|
| CAUGHT | CAUGHT | . |
| CAUGHT | COTTON | . |
| CAUGHT | WE | . |
| CAUGHT | WEAR | . |
| CAUGHT | WERE | |
| COTTON | CAUGHT | |
| COTTON | COTTON | |
| ⋮ | ⋮ | |
| WEAR | CAUGHT | 0 |
| WEAR | COTTON | .9 |
| WEAR | WE | .1 |
| WEAR | WEAR | 0 |
| WEAR | WERE | 0 |
| WERE | CAUGHT | .4 |
| WERE | COTTON | .1 |
| WERE | WE | .5 |
| WERE | WEAR | 0 |
| WERE | WERE | 0 |

*Fig. 1B*

Tree Node Dictionary

| Word | UT Node Identifier |
|---|---|
| CAUGHT | 2 6 10 11 |
| COTTON | 2 6 10 12 13 |
| WE | 1 3 7 |
| WEAR | 1 4 8 |
| WERE | 1 5 9 |

*Fig. 5*

BIGRAM CONTEXT = WEAR
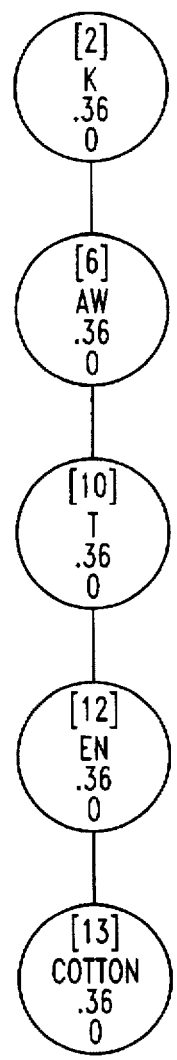
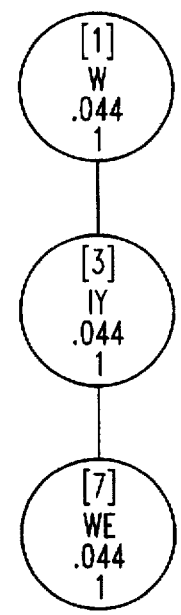
*Fig. 13B*
*Fig. 13A*

5,758,024

1

METHOD AND SYSTEM FOR ENCODING PRONUNCIATION PREFIX TREES

TECHNICAL FIELD

This invention relates to a computer system for computer speech recognition and, more particularly, to a method and system for compactly encoding pronunciation prefix trees.

BACKGROUND OF THE INVENTION

The rapid and accurate recognition of human speech by a computer system has been a long-sought goal by developers of computer systems. The benefits that would result from such a computer speech recognition (CSR) system are substantial. For example, rather than typing a document into a computer system, a person could simply speak the words of the document, and the CSR system would recognize the words and store the letters of each word as if the words had been typed. Since people generally can speak faster than type, efficiency would be improved. Also, people would no longer need to learn how to type. Computers could also be used in many applications where their use is currently impracticable because a person's hands are occupied with tasks other than typing.

To process speech, typical CSR systems define basic units of speech, referred to as phonemes. Each phoneme corresponds to a different sound. For example, the word "cotton" is typically spoken with four phonemes: "k," "aw," "t," and "en." CSR systems use phonetic dictionaries to store the phonemes of each word in the dictionary. FIG. 1A illustrates a phonetic dictionary for a sample 5-word vocabulary. The phonetic dictionary contains each word in the vocabulary along with the phonemes that compose the word. For example, the dictionary entry for the word "cotton" is "cotton k aw t en." When a CSR system receives a portion of speech, it identifies which phonemes are spoken. Once the phonemes are identified, the CSR system can scan the dictionary to determine which word comprises those phonemes. If the CSR system could correctly identify each phoneme, then speech recognition would be a relatively straightforward task. However, the correct identification of the phonemes is proving to be a difficult task.

The difficulties encountered in phoneme recognition result from the almost unlimited variations in the speech patterns of people. This variations result from the accents of the speaker, the speed and pitch at which a person speaks, the current health (e.g., with a cold) of the speaker, the age and sex of the speaker, etc. Thus, when a CSR system processes a portion of speech, it will assign a probability to each phoneme indicating the likelihood that the portion of speech corresponds to that phoneme. For example, if a word that may be "were" or "wear" is spoken, a CSR system may consider the speech to comprise two portions. For the first portion, the CSR system may assign a probability of 0.9 to the phoneme "w", a probability of 0.1 to the phoneme "axr", and a probability of zero to all other phonemes. For the second portion, the CSR system may assign a probability of 0.6 to phoneme "er", a probability of 0.3 to phoneme "axr", a probability of 0.1 to phoneme "w", and a probability of zero to all other phonemes. The CSR system can then recognize the sequence of phonemes with the highest probability that most closely matches a word as the spoken word. In this example, the probability that the spoken word is "were" is 0.54 (i.e., 0.9×0.6), and the probability that the spoken word is "wear" is 0.36 (i.e., 0.9×0.4). Thus, the CSR system would recognize the word as "were."

To further help account for these variations in speech patterns, CSR systems use various probabilities accumulated from typical speech patterns to help identify the spoken words. In particular, CSR systems use the probability that a particular word will be spoken in normal everyday speech. The phonetic dictionary of FIG. 1A illustrates sample probabilities for the words of the vocabulary. These probabilities are context independent, that is, they represent the probability that the word will be spoken regardless of the words spoken before or after that word. For example, in this sample vocabulary, the word ("we" has a probability of 0.3 and the word "cotton" has a probability of 0.1. These probabilities indicate that the word "we" is typically spoken 3 times as often as the word "cotton." Since the context-independent probabilities are based on a single word, they are referred to as the unigram probabilities. Continuing with the above example, if the context independent probabilities are also taken into consideration, then the probability that the spoken word is "were" is 0.081, and the probability that the spoken word is "wear" is 0.09. Thus, when the context independent probability is taken into consideration, the CRS system would recognize the word as "wear", rather than "were."

To further improve recognition, CSR systems may also use context-dependent probabilities. A context-dependent probability is the probability that each word will follow a certain sequence of other words. For example, the probability the words "to be or not to" are followed by the word "be" is very high. However, the number of probabilities that need to be stored grows exponentially with the length of the sequence. In particular, the number of probabilities that need to be stored to represent all possible sequences of l words is $n^l$, where n is the number of words in the dictionary. Since typical dictionaries can contain 60,000 words, a tremendous amount of storage is needed to represent the context-dependent probabilities. Consequently, CSR systems typically limit the length of sequences for which to store probabilities to two (i.e., l=2). For example, a CSR system would store the probability that the word "be" follows the word "to" and the probability that the word "or" would follow the word "be," but not the probability that the word "or" would follow the words "to be." FIG. 1B illustrates the context-dependent probabilities for sequences of length 2 of the sample vocabulary. For example, the probability that the word "wear" is followed by the word "cotton" is 0.9 and the probability that the word "wear" is followed by the word "we" is 0.1. Since these context-dependent probabilities are based on a sequence of two words, they are referred to as bigram probabilities. Continuing with the above example, if the word "we" is spoken next and the context-dependent probabilities are taken into consideration, then the probability that the first spoken word is "were" is 0.0405, and the probability that the first spoken word is "wear" is 0.009. Thus, the CRS system would recognize the first spoken word as the word "were."

Because of the tremendous amount of computation required to recognize speech in large vocabulary systems, a data organization based on pronunciation prefix trees is used to eliminate redundant computation associated with matching the duplicated phonetic prefixes found at the beginning of the words in the system vocabulary.

FIG. 2A illustrates a prefix tree data structure for the sample phonetic dictionary. The prefix tree data structure contains the same information as in the phonetic dictionary, but in a format that saves space and that can be rapidly searched. The prefix tree data structure, referred to as a pronunciation prefix tree (PPT), saves space by eliminating the storing of redundant phonemes for words that share common prefixes. For example, the pronunciation for the words "caught" and "cotton" are represented by nodes 201-206. Since the first three phonemes in "k," "aw," and "t" are shared by both words, the PPT contains only one node for each of these phonemes. A CSR system can rapidly search a PPT by following the path of recognized phonemes from the root node to a leaf node that represents a spoken word. For example, if the phonemes "k aw t en" are received, then the CSR system would traverse the prefix tree starting at the root node 200 and finishing at the leaf node 206, which represents the word "cotton." Each leaf node represents a word in the dictionary and contains the unigram probability for that word. For example, leaf node 206 contains the probability of 0.1, which is the unigram probability for the word "cotton." Each node in the PPT is at a depth within the prefix tree that represents the number of branches from the root to that node. For example, the depth of node 206 is 5. Since the PPT of FIG. 2A contains unigram probability, it is known as a unigram PPT.

FIG. 2B is a bigram PPT representing the bigram probabilities for the words in the dictionary that follow the word "were." Each leaf node corresponds to a word that can follow the word "were" and contains the probability that such a word will follow the word "were." Thus, to represent all bigram probabilities, each word in the dictionary will have a bigram PPT containing corresponding probabilities for words that will follow that word. The representation of such bigram PPTs requires a large amount of storage. For example, a typical dictionary has 5.02 million bigram probabilities represented in bigram PPTs with a total of 18.2 million nodes. Assuming that each node uses 4 bytes of memory, then 72.8 million bytes would be needed to store all bigram probabilities. Such a large amount of data makes it impractical not only to store such information on conventional memory devices, but also to locate rapidly the probabilities.

SUMMARY OF THE INVENTION

The present invention provides a method and system for linearly encoding bigram pronunciation prefix trees in a way that significantly reduces the amount of storage needed to represent the bigram pronunciation prefix tree and allows for rapid determination of child nodes during speech recognition. The computer system represents the bigram pronunciation prefix trees with a linear encoding for each bigram pronunciation prefix tree along with one tree node dictionary. The computer system generates a tree node dictionary which contains a listing of the phonemes that compose each word in the vocabulary. The computer system then repeats the following for each bigram pronunciation prefix tree. The computer system sets the probability of each non-leaf node to a probability based on the probability of its child nodes (i.e., "smearing"). The computer system then sets the factor of each node to the probability of the node divided by the probability of a parent node of the node (i.e., "factoring"). Finally, the computer system generates an encoded pronunciation entry for each leaf node of the bigram pronunciation prefix tree. The encoded pronunciation entry indicates the word represented by the leaf node and contains the factor of a nearest ancestor node with a factor other than a predefined factor.

The linearly encoded bigram pronunciation prefix tree can then be used during speech recognition to instantiate a bigram context. The bigram context is an instantiation of the bigram pronunciation prefix tree with probabilities in each node indicating the likelihood that the corresponding phonemes have been spoken. As each phoneme is spoken, the computer system uses the linear encoding to identify the next child nodes to be added to the bigram context. The computer system then uses the tree node dictionary to rapidly identify the child nodes to be added to the bigram context.

In addition to encoding bigram pronunciation prefix tree, the computer system can encode pronunciation trees for trigrams and, in general, n-grams of arbitrary length. Each pronunciation prefix tree, regardless of the length of the n-gram, contains the same type of information, that is, leaf nodes that correspond to words and probabilities. When recognizing speech, the n-gram context is set to the number of words of the n-gram minus 1. For example, the trigram context is set to the two words associated with the linearly encoded trigram pronunciation prefix tree.

BRIEF DESCRIPTION OF THE DRAWINGS

FIG. 1A illustrates a phonetic dictionary for a sample 5-word vocabulary.

FIG. 1B illustrates the context-dependent probabilities for sequences of length 2 of the sample vocabulary.

FIG. 5 shows a Tree Node Dictionary for the unigram PPT of FIG. 4.

FIGS. 11A–13B illustrate the PPTs that are generated by the CSR system.

DETAILED DESCRIPTION OF THE INVENTION

In a preferred embodiment, the present invention provides a method and system for linearly encoding bigram pronunciation prefix trees and for recognizing speech using the linearly encode pronunciation prefix tree. The bigram pronunciation prefix trees are encoded in such a way that the "smeared" probabilities can be determined during recognition based solely on the ancestor nodes. A smeared probability refers to a probability stored in each non-leaf node that is based on the probabilities of the descendent nodes of that node. The use of smeared probabilities allows for probability calculations to occur during recognition before the identity of the word is known.

The system of the present invention encodes the bigram pronunciation prefix trees with the smeared probabilities as a combination of one tree node dictionary and a linear encoding for each bigram pronunciation prefix. The tree node dictionary contains a listing of the phonemes that compose each word in the vocabulary. A linear encoding of each bigram pronunciation prefix tree contains an entry for each leaf node. The entry identifies the word of the leaf node along with the factor of the nearest ancestor node with a factor other than 1.0. Each node in the bigram pronunciation prefix tree is assigned a factor that is equal to the smeared probability of that node divided by the probability of the parent node. The factors have the characteristic that the factor in each node that has no sibling nodes is 1.0. Since the majority of the nodes in bigram pronunciation prefix pronunciation trees typically have no siblings, the factors of 1.0 can be omitted from the encoding.

The linearly encoded bigram pronunciation prefix tree can then be used during speech recognition to instantiate a bigram context. The bigram context is an instantiation of the bigram pronunciation prefix tree with probabilities in each node indicating the likelihood that the corresponding phonemes have been spoken. As each phoneme is spoken, the computer system uses the linear encoding to identify the next child nodes to be added to the bigram context. The computer system then uses the tree node dictionary to rapidly identify the child nodes to be added to the bigram context.

Figure 2A:
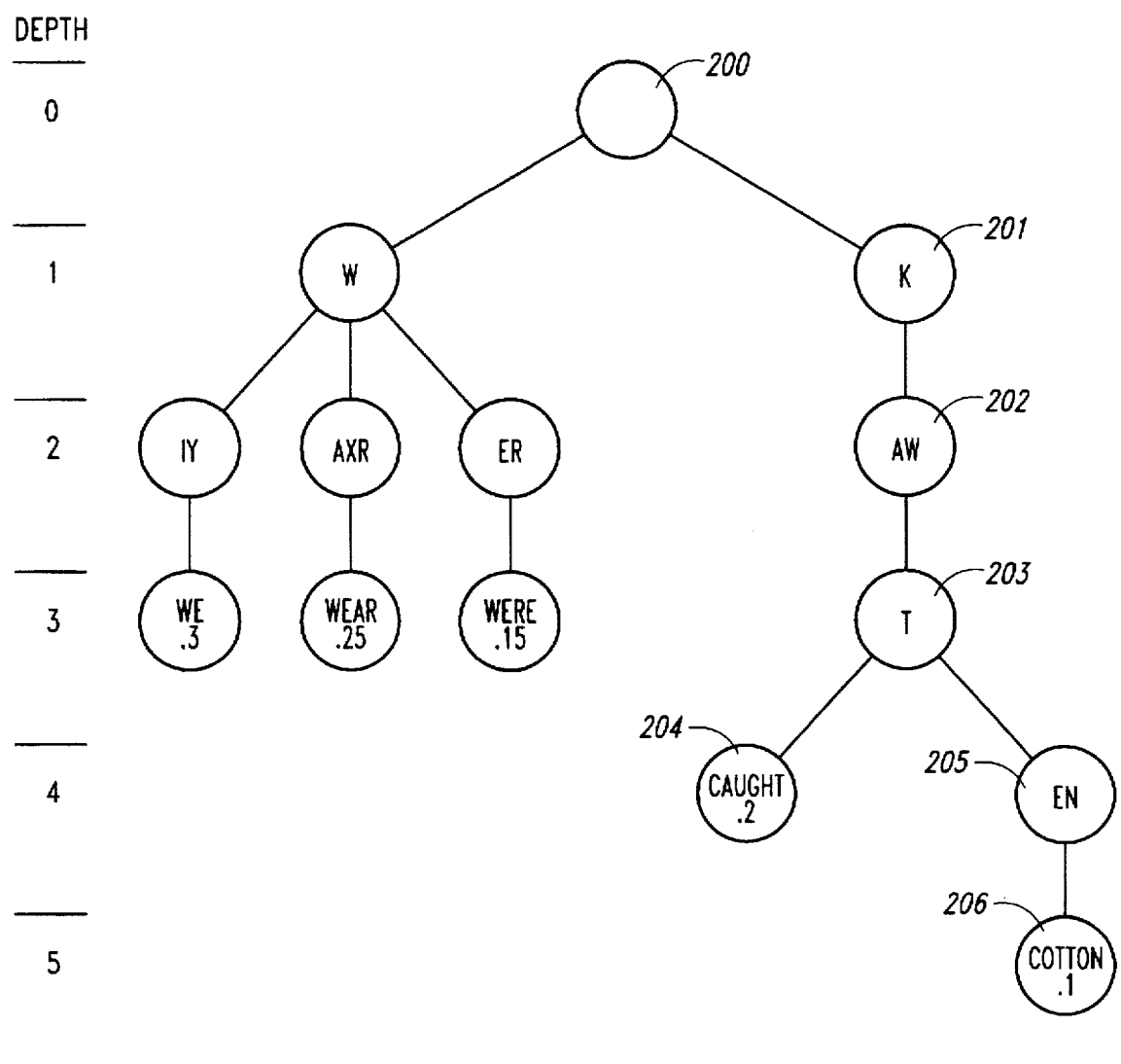
FIG. 2A illustrates a unigram PPT for the sample phonetic dictionary.
Figure 2B:
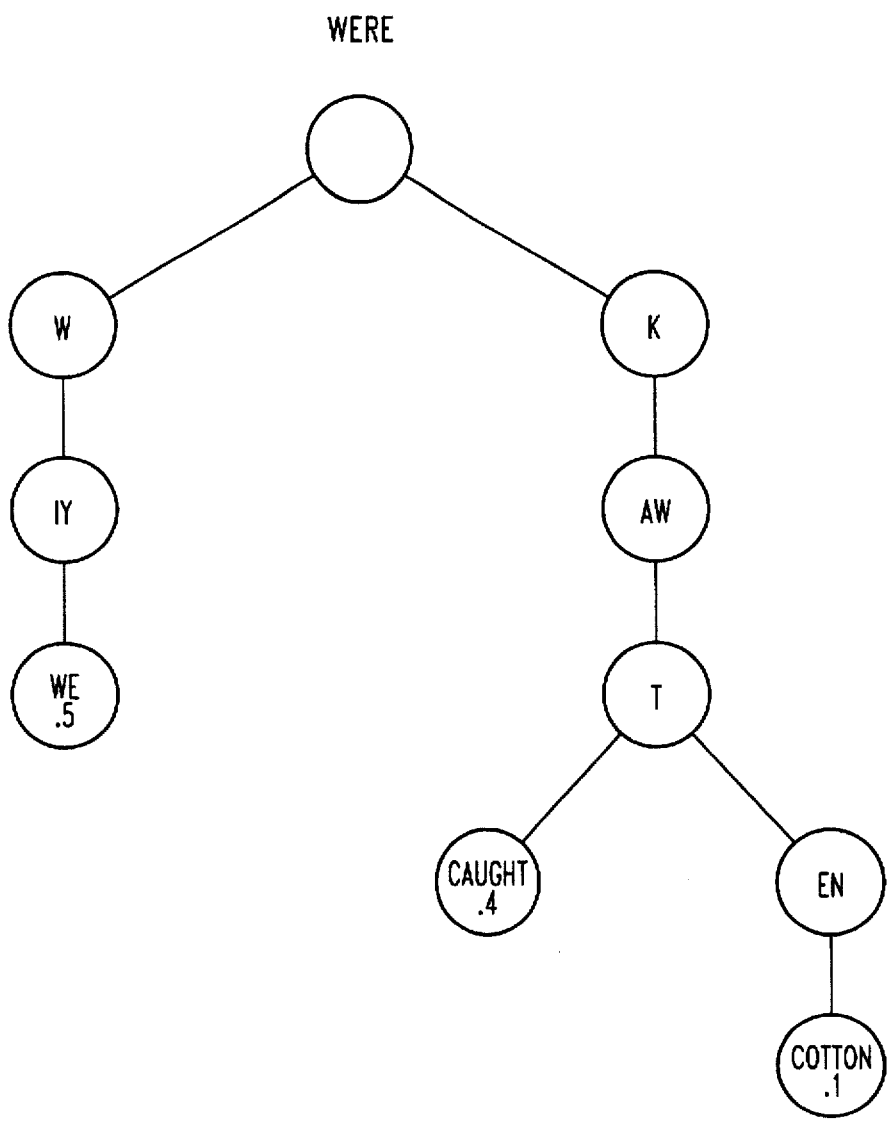
FIG. 2B is a bigram PPT for the words in the dictionary that follow the word "were."
Figure 3:
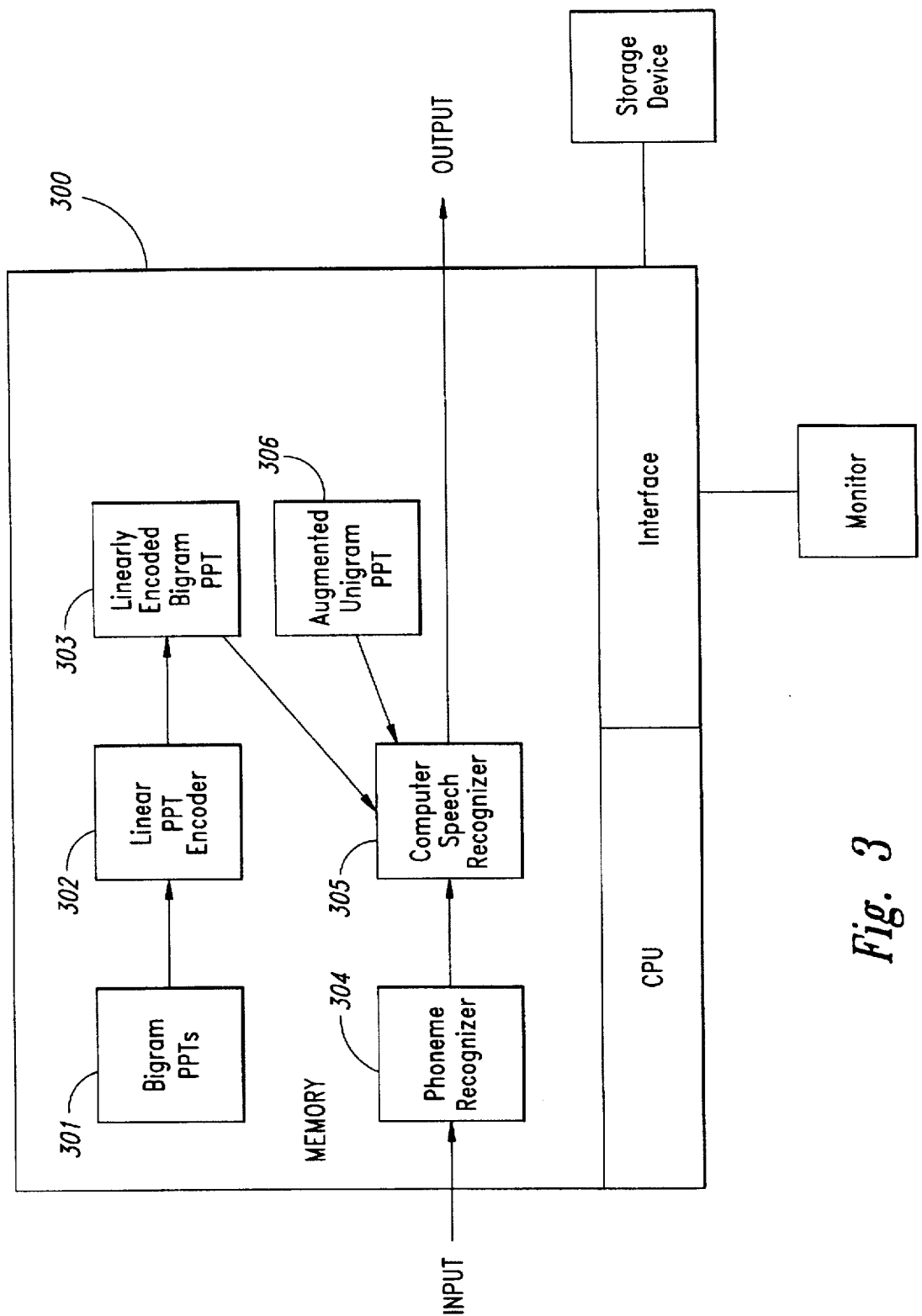
FIG. 3 is a block diagram of a computer system illustrating components of the present invention.

FIG. 3 is a block diagram of a computer system illustrating components of the present invention. The computer system may be a standard computer with central processing unit, memory, and various storage devices. The computer system comprises bigram PPTs 301, a linear PPT encoder 302, linearly encoded bigram PPT 303, a phoneme recognizer 304, a computer speech recognizer 305, and a unigram PPT 306. A computer program implementing the linear PPT encoder and computer speech recognizer is typically stored on a computer-readable medium such as computer memory or disk drive. The linear PPT encoder 302 encodes the bigram PPTs 301 to generate linearly encoded bigram PPTs 303. The linearly encoded bigram PPTs are a compact encoding of the bigram PPTs. During speech recognition, the CSR system 305 receives a sequence of phonemes from a phoneme recognizer 304 and uses the linearly encoded bigram PPTs 303 and the unigram PPT 306 to recognize the received sequence of phonemes as words.

Figure 4:
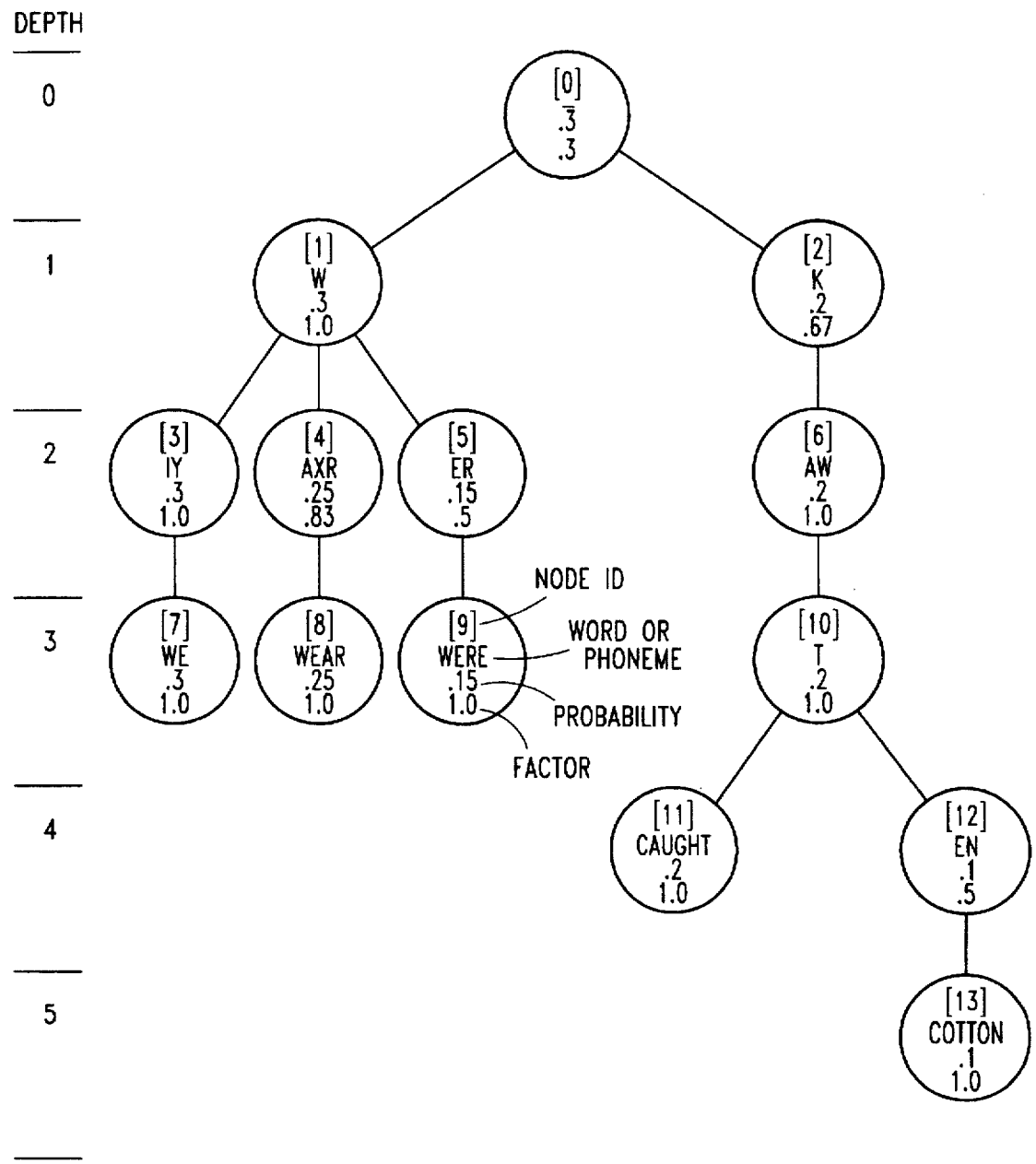
FIG. 4 illustrates an augmented unigram PPT for the sample dictionary.

FIG. 4 illustrates an augmented unigram PPT for the sample dictionary. An augmented unigram PPT is a unigram PPT that has been augmented to contain a factor in each node and that has its nodes ordered by the unigram probabilities. The child nodes of each parent node are ordered from left-to-right based on the maximum probability of a descendent leaf node of that child node. For example, since the maximum probability of a descendent leaf node of node [1] is 0.3, and the maximum probability of a descendent leaf node of node [2] is 0.2, node [1] is to the left of node [2]. Similarly, since the maximum probabilities of the descendent leaf nodes of node [3], node [4], and node [5] are 0.3, 0.25, and 0.15, node [3] is the leftmost and node [5] is the rightmost. Each node of the unigram PPT is assigned a sequential node identification. The node identifications are assigned as the nodes are visited in a breadth-first, left-right traversal of the unigram PPT. Thus, the nodes at the same depth have sequential unique identifiers. For example, the nodes at depth 3 contain the identifiers [3], [4], [5], and [6].

The factors for the augmented unigram PPTs are generated from the probabilities according to equations (1) and (2). First, the probabilities in each non-leaf node is set based on the probabilities in the leaf nodes. The probability in each non-leaf node is generated by the following equation:

$$P'(n) = \max_{\{x | x \in \text{child}(n)\}} (P(x)) \quad (1)$$

That is, the probability in each non-leaf node of the unigram PPT is the maximum of the probabilities of its child nodes. For example, node [1] contains a probability of 0.3, which is the maximum probability of 0.3, 0.25, and 0.15, which are the probabilities of its child nodes [3], [4], and [5]. The factors in each node are generated by the following equation:

$$f(n) = \frac{P'(n)}{P'(\text{parent}(n))} \quad (2)$$

That is, the factor of a node is the probability of that node divided by the probability of its parent node. For example, the probability of node [5] is 0.15 and the probability of its parent node [1] is 0.3, thus the factor for node [5] is 0.15 divided by 0.3, which is 0.5. An augmented unigram PPT stores only the factor for a node because the probabilities can be generated from the factors. The probability associated with a node is the probability of its parent node times the factor of the node. For example, the probability of node [1] is 0.3 and the factor for child node [5] is 0.5. Thus, the probability for node [5] is 0.3 times 0.5, which is 0.15. The use of such factors, rather than probabilities, is beneficial because the majority of the factors are typically 1.0, which lends itself to a compact representation. That is, any factor that is omitted can be presumed to be 1.0.

Once the augmented unigram PPT is generated, the linear PPT encoder generates a Tree Node Dictionary (TND). FIG. 5 contains a Tree Node Dictionary for the augmented unigram PPT of FIG. 4. The TND contains an entry for each word in the dictionary along with the node identifiers of each node that would be visited in the augmented unigram PPT when recognizing that word. For example, to recognize the word "cotton," the nodes [0], [2], [6], [10], [12], and [13] would be traversed. Since the traversal always starts out at node [0], that node identifier can be omitted from the TND. The TND and the linearly encoded bigram PPTs represent an encoding of the bigram PPTs.

Figure 6:
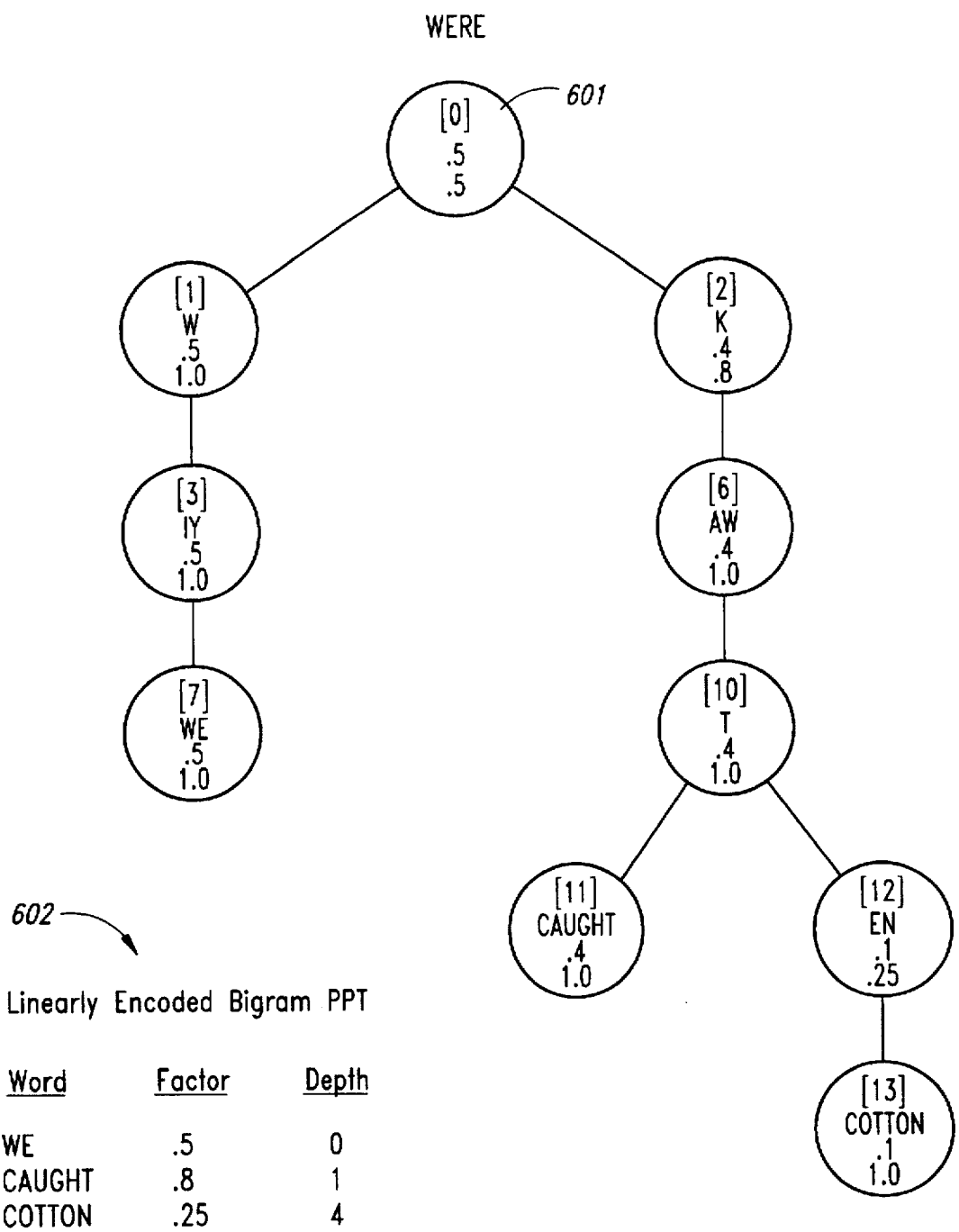
FIG. 6 represents the augmented bigram PPT for the word "were."
Figure 7:
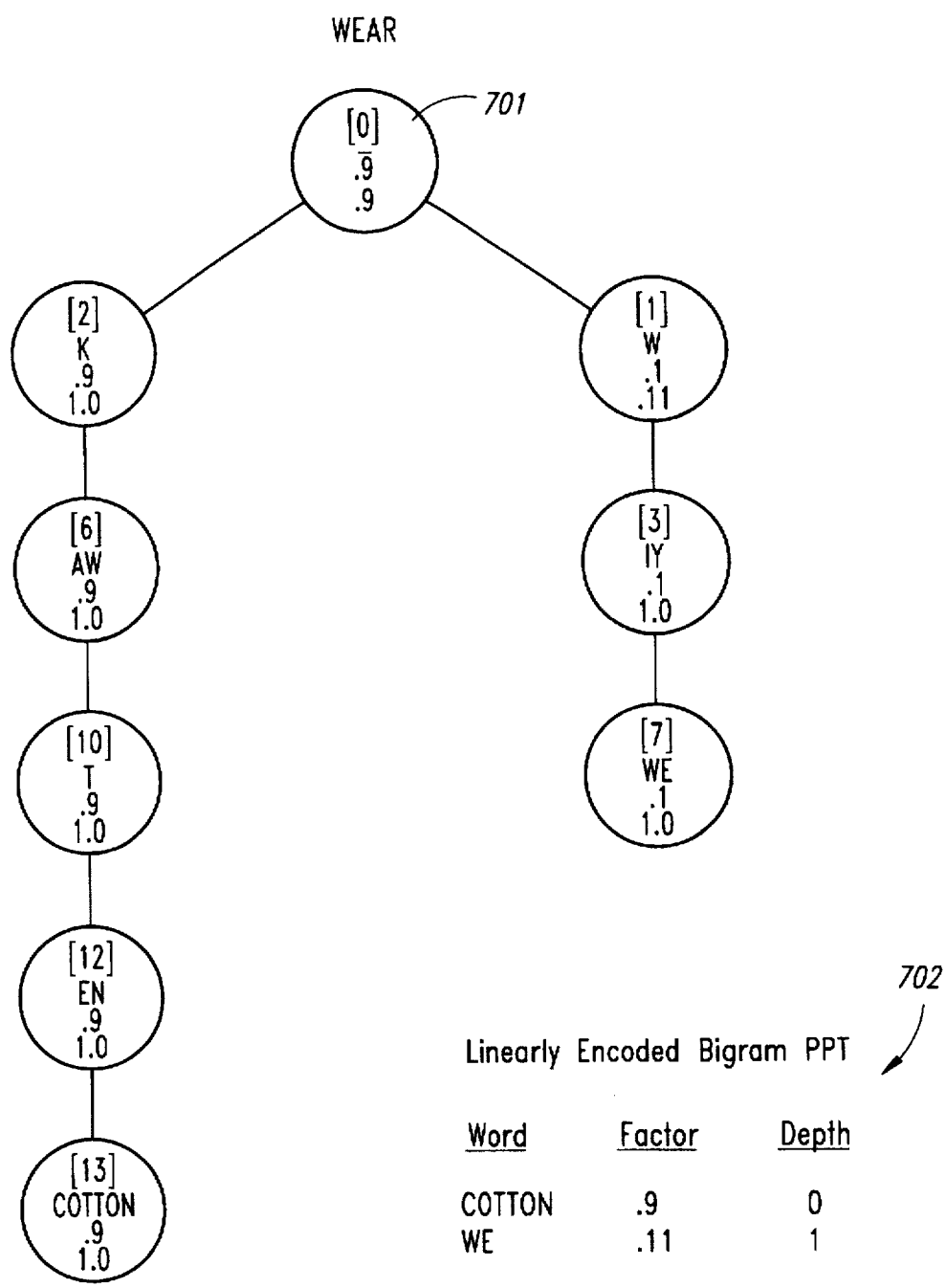
FIG. 7 represents the bigram PPT for the word "wear."

The linear PPT encoder also augments each bigram PPT in a manner analogous to the augmentation of the unigram PPT. In particular, a factor is generated for each non-leaf node. FIG. 6 represents the augmented bigram PPT for the word bigram context "were," and FIG. 7 represents the augmented bigram PPT for the word bigram context "wear." The linear PPT encoder generates the linear encodings 602 and 702 for the augmented bigram PPTs 601 and 701, respectively. The linearly encoded bigram PPTs contain an entry for each leaf node. From a linearly encoded bigram PPT and the TND, the bigram PPT can be regenerated. Thus, a linearly encoded bigram PPT represents a compact encoding of the bigram PPT. Each entry of the linearly encoded bigram PPT (LEBPPT) identifies a word, a factor, and a depth within the augmented bigram PPT. For example, the second entry in the LEBPPT 602 identifies the word "caught," the factor of 0.8, and the depth of 1. This second entry indicates that the leaf node for the word "caught" has a probability that is 0.8 times the probability of the previous entry in the LEBPPT. That is, the probability for the node [11] is 0.8 times the factor of the first entry in the LEBPPT 602, which is 0.5. Further, this second entry indicates that the factor of 0.8 is stored in a node with depth of 1 within the augmented bigram PPT.

The linear PPT encoder generates an LEBPPT by performing a left-right, depth-first traversal of the augmented bigram PPT. For each leaf node visited, the linear PPT encoder adds an entry to the LEBPPT that identifies the word within the leaf node and the factor and depth of the last node visited that had a factor other than 1.0. For example, when the leaf node [7] of FIG. 6 is visited, the last node visited with a factor other than 1.0 was node [0]. Therefore, the first entry in the LEBPPT is "we 0.5 0", indicating a factor of 0.5 and a depth of 0. The second entry corresponds to node [11]. The last node visited, prior to visiting node [11], with a factor other than 1.0 is node [2], which lo has a factor of 0.8 and a depth of 1. Thus, the second entry in the LEBPPT is "caught 0.8 1." Finally, when node [13] is visited, the last node visited with a probability other than 1.0 is node [12], which has a factor of 0.25 and a depth of 4. Thus, the third entry in the LEBPPT is "cotton 0.25 4."

A bigram PPT can be regenerated from the LEBPPT by decoding the LEBPPT using the Tree Node Dictionary (TND). For each entry in the LEBPPT, a decoder would retrieve the entry from the TND for the word stored in the LEBPPT entry. (A preferred CSR system does not actually perform such a decoding prior to the start of recognition, rather such a decoding is integrated with recognition.) The TND entry identifies the nodes that are part of the bigram PPT for that word. That is, the entry identifies the nodes of the bigram PPT on the path from the root node to the leaf node for that word. The decoder adds a node to the bigram PPT for each identified node. For example, when the decoder encounters the first entry of LEBPPT 601, the decoder adds the root to the bigram PPT and adds a node for each node identified in the TND entry for the word "we." The decoder then sets the factor of each added node to 1.0, except for the node at the depth stored in the LEBPPT entry. The decoder sets the factor of that node to the factor in the LEBPPT entry. Similarly, when the decoder encounters the second entry, the decoder retrieves the entry from the TND for the word stored in the second entry. The decoder adds a node to the bigram PPT for each identified node (if not already added). The decoder retrieves the identifiers of the nodes for the word "caught" from the TND and adds a node for each identified node. The decoder then sets the factor for the node created at depth 1 to 0.8 and all other factors to 1.0. Finally, when the decoder encounters the third entry, it retrieves the TND entry for the word "cotton" and adds a node for each identified node that has not yet been added, that is, node [12] and node [13]. The decoder then sets the factor of the node at the depth of the LEBPPT entry to the factor 0.25 of the LEBPPT entry and all other factors to 1.0. The PPT generated at this point is the augmented bigram PPT. The decoder then traverses the augmented bigram PPT to generate the probabilities for the leaf nodes. One skilled in the art would appreciate that to compactly represent a bigram PPT, the depth of the column of the linearly encoded bigram tree is not needed. However, as will be seen below, the inclusion of the depth allows for rapid creation of bigram context during speech recognition.

Figure 8:
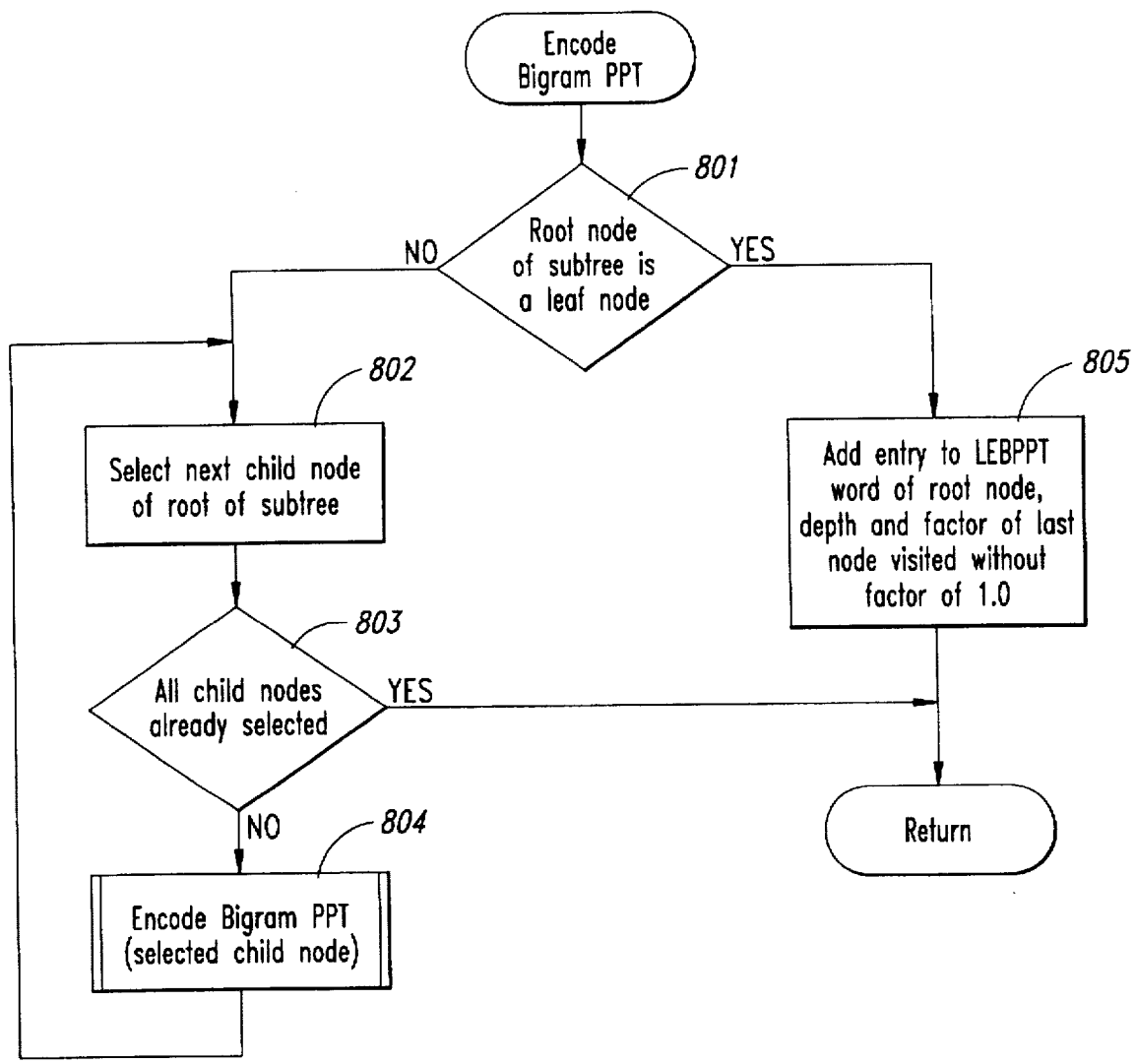
FIG. 8 is a flow diagram of an Encode Bigram PPT routine.

FIG. 8 is a flow diagram of an Encode Bigram PPT routine. The Encode Bigram PPT routine is performed by the linear PPT encoder. The routine is a recursive routine that performs a depth-first, left-to-right traversal of an augmented bigram PPT that is passed to the routine and creates a linearly encoded bigram PPT. The routine is initially invoked passing the root node of the augmented bigram PPT. Each time the routine recursively invokes itself, it passes a subtree of the augmented bigram PPT. In step 801, if the root node of the passed subtree is a leaf node, then the routine continues at step 805, else the routine continues at step 802. In steps 802–804, the routine loops selecting each child node of the root node of the passed subtree and recursively invoking this routine passing the selected child node as the root node of a subtree. In step 802, the routine selects the next child node of the passed subtree starting with the first child node. In step 803, if all the child nodes of the root node of the passed subtree have already been selected, then the routine returns, else the routine recursively invokes this routine passing the selected node as the root node of a subtree and loops to step 802 to select the next child node. In step 805, the routine adds an entry to the LEBPPT for the word of the root node, and adds the depth and factor of the last node visited that does not have a factor of 1.0 and then returns. Although this routine has been described as encoding a bigram PPT, the same routine without modification can be used to encode any PPT, regardless of the length of the n-gram to which it corresponds.

Figure 9:
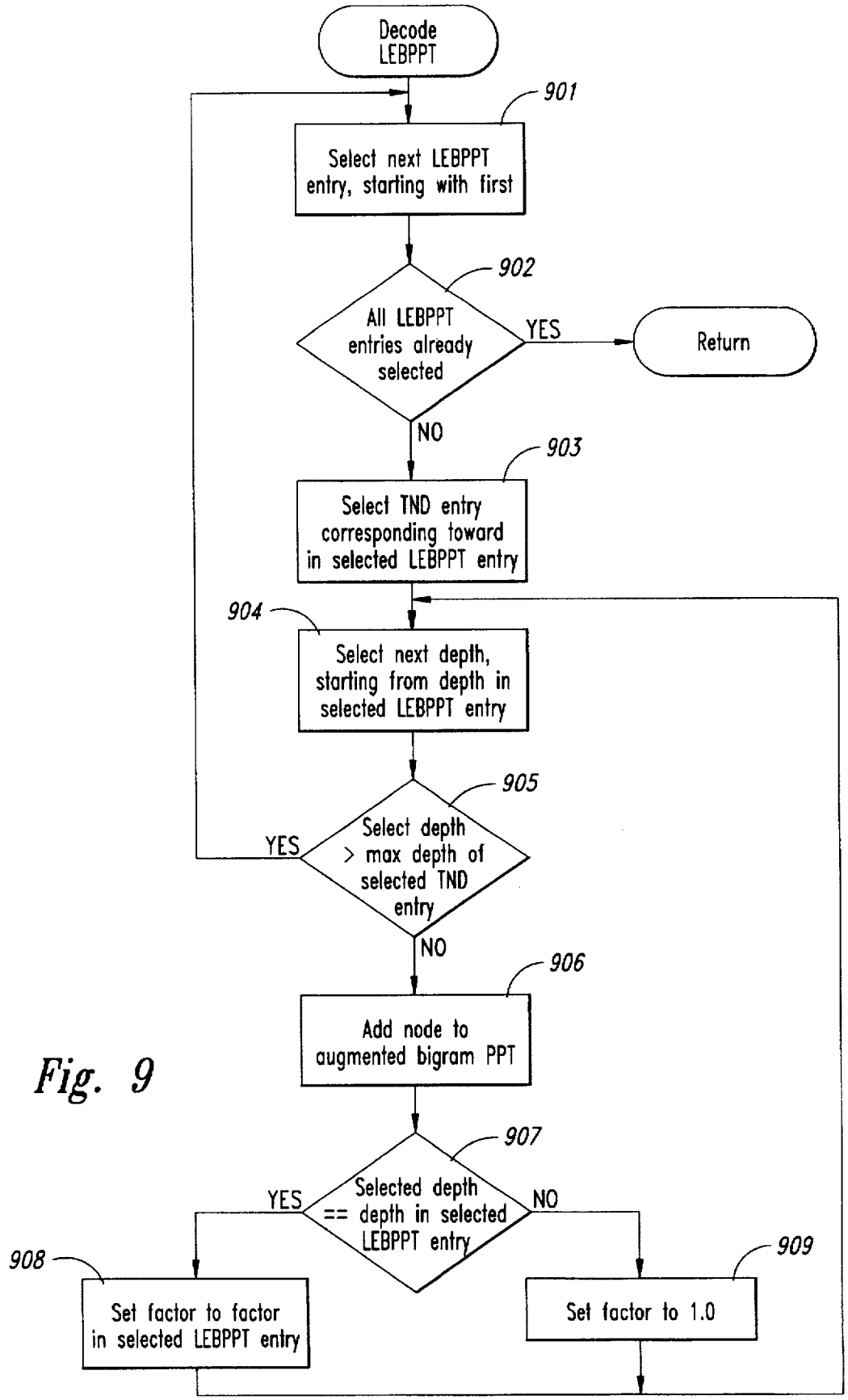
FIG. 9 is a flow diagram of the Decode LEBPPT routine.

FIG. 9 is a flow diagram of the Decode LEBPPT routine. The Decode LEBPPT routine is passed a LEBPPT and a TND and regenerates the augmented bigram PPT. As mentioned above, a preferred CSR system does not need to regenerate the augmented bigram PPTs. Rather, the CSR system retrieves the needed information directly from the LEBPPT as described below. In steps 901–909, the routine loops selecting each LEBPPT entry and adding nodes to the augmented bigram PPT represented by that entry. In step 901, the routine selects the next LEBPPT entry starting with the first. In step 902, if all of the LEBPPT entries have already been selected, then the routine returns, else the routine continues at step 903. In step 903, the routine selects the TND entry corresponding to the word in the selected LEBPPT entry. In steps 904–909, the routine loops processing each node identified in the selected TND entry and adding it to the augmented bigram PPT if not already added. In step 904, the routine selects the next depth starting with the depth in the selected LEBPPT entry. If the selected depth is greater than the maximum depth for the selected TND entry, then the routine loops to step 901 to select the next LEBPPT entry, else the routine continues at 906. In step 906, the routine adds a node corresponding to the node identified in the selected TND entry to the augmented bigram PPT. In step 907, if the selected depth equals the depth in the selected LEBPPT entry, then the routine continues at step 908, else the routine continues at step 909. In step 908, the routine sets the factor of the added node to the factor in the selected LEBPPT entry. In step 909, the routine sets the factor of the added node to 1.0. The routine then loops to step 904 to select the next depth.

Figure 10:
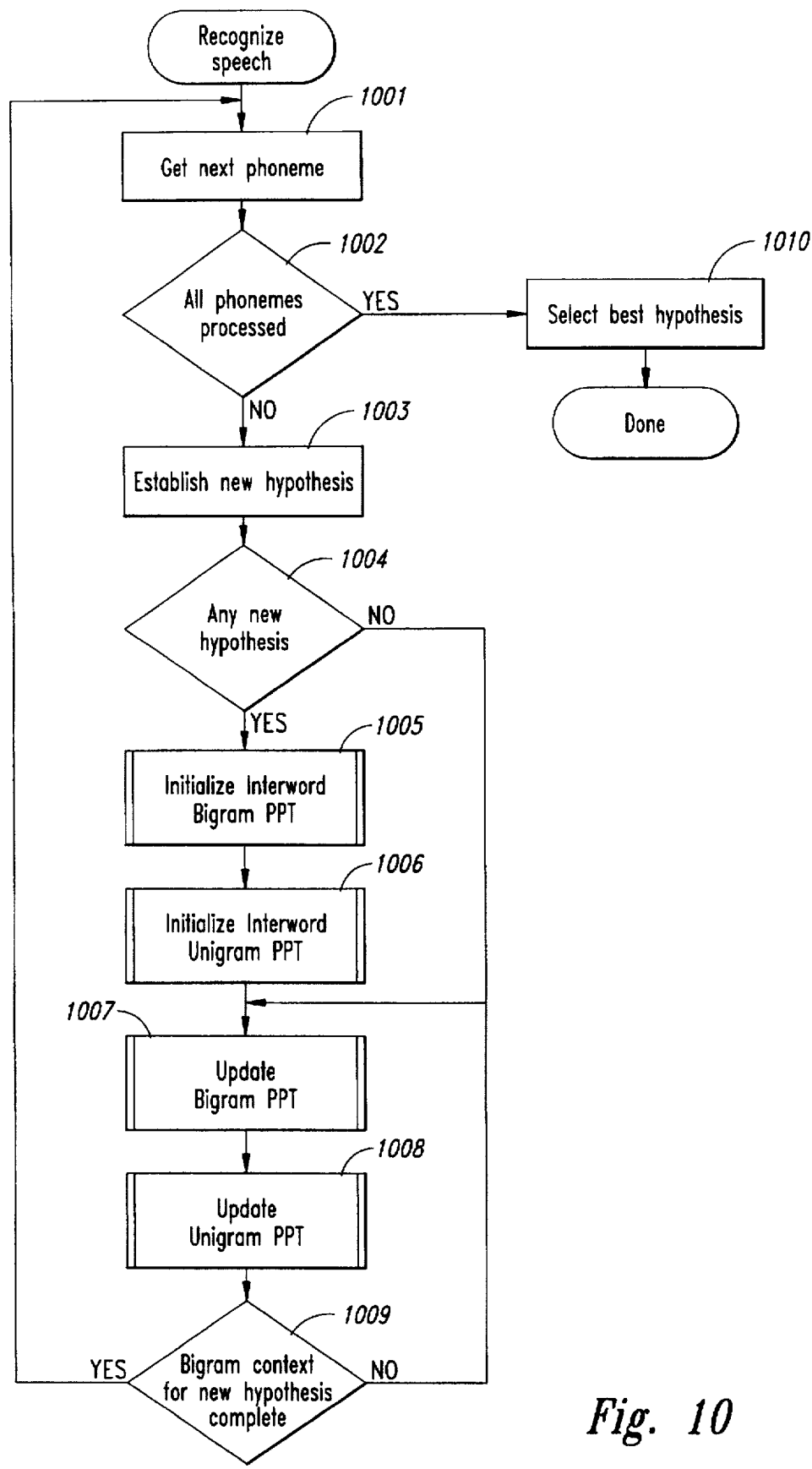
FIG. 10 is a flow diagram of a CSR system that uses an LEBPPT.

FIG. 10 is a flow diagram of a CSR system that uses an LEBPPT. The CSR system retrieves a sequence of phonemes and selects the sequence of words that best matches the phonemes. The recognition system repeatedly generates new hypotheses as to the sequence of words that a sequence of phonemes represent as each phoneme is processed. For example, the CSR system may establish the following hypotheses:

$H1(t) =$ "we wear"   $P(H1(t)) = .6$
$H2(t) =$ "we were"   $P(H2(t)) = .4$

The CSR system extends these hypotheses by referring to the unigram and bigram PPTs in conjunction with the TND.

Figure 11B:
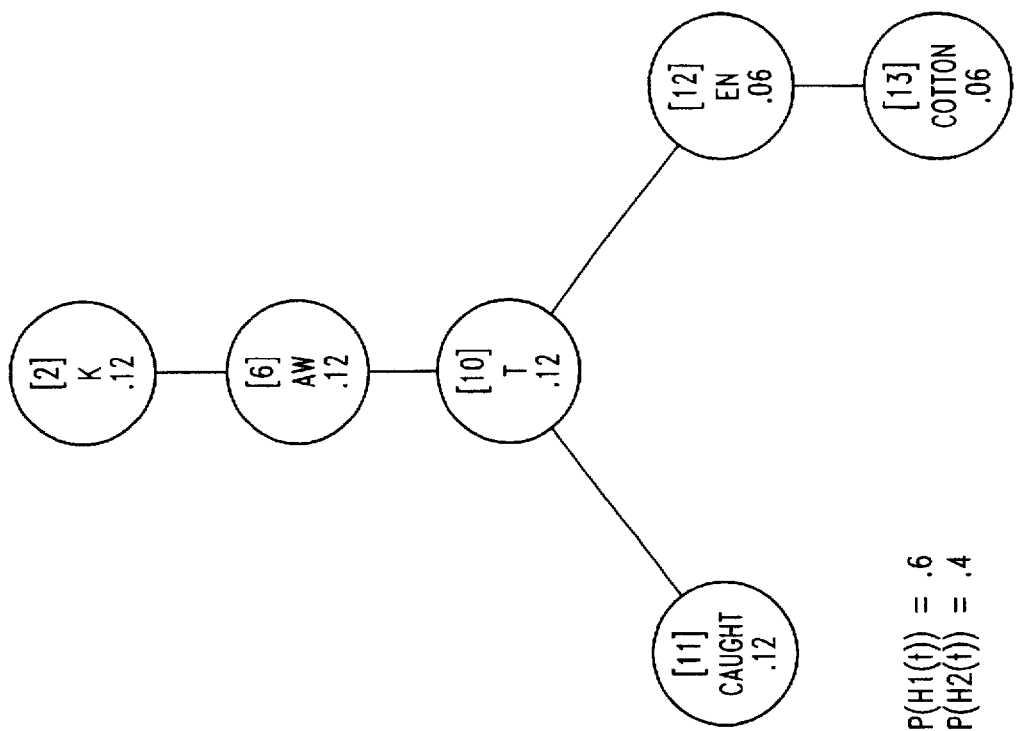
Figure 11A:
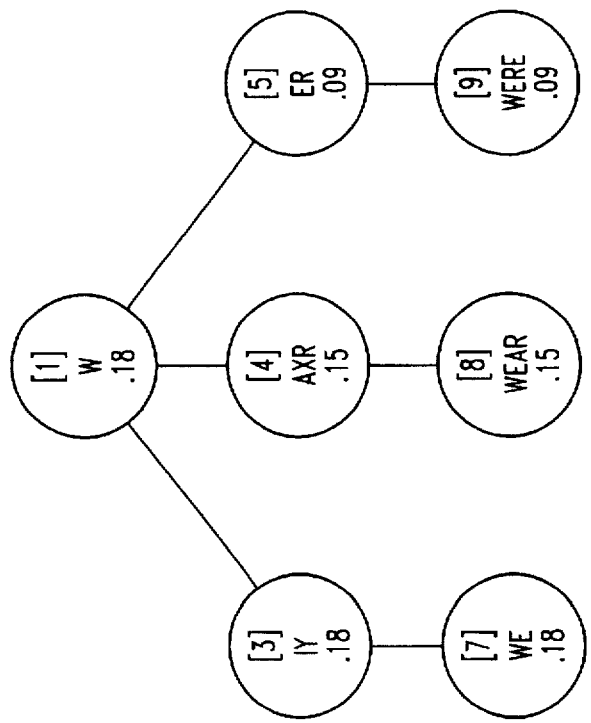
Figure 12B:
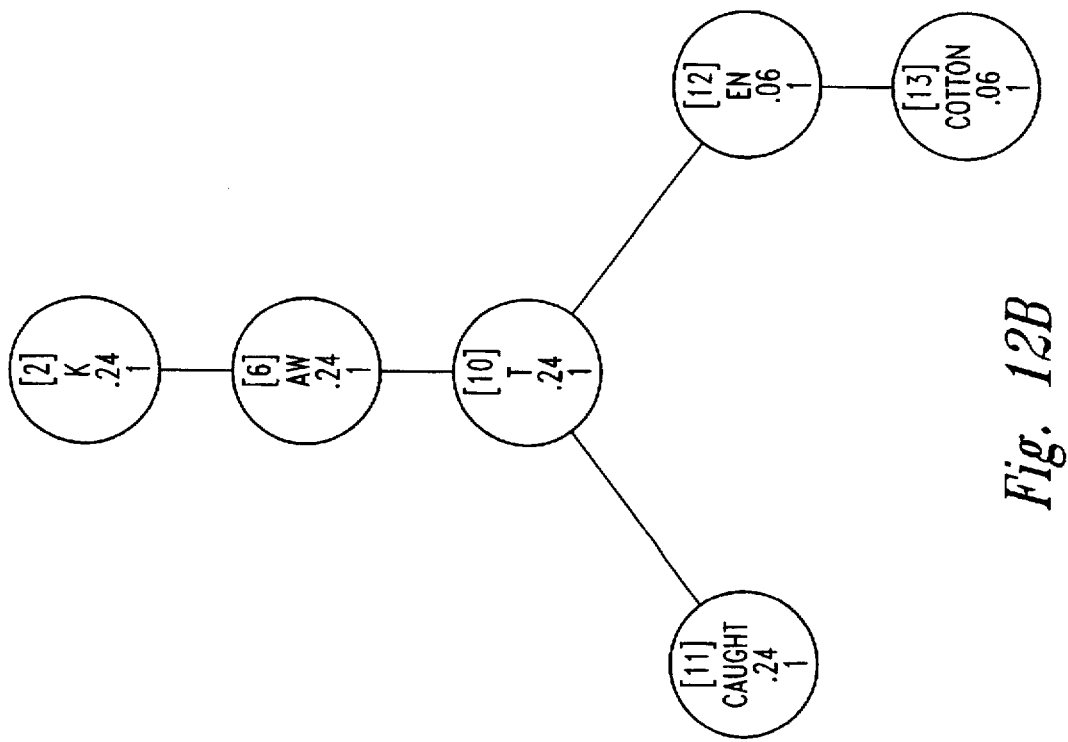
Figure 12A:
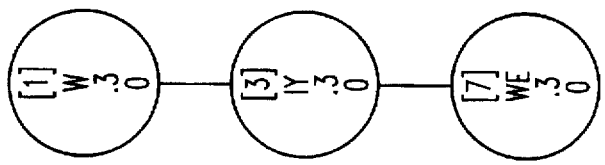

FIGS. 11A–13B illustrate the PPTs that are generated by the CSR system. The CSR system generates a unigram PPT for the best hypothesis (i.e., the hypothesis with the highest probability) and a bigram PPT for each hypothesis (referred to as a bigram context). The nodes of the unigram PPT contain the probability of the best hypothesis times the unigram probability for that node. For example, the probability in node [5] of FIG. 11A is 0.09, which is the unigram probability 0.15 from node [5] of FIG. 4 times the probability 0.6 of the best hypothesis. The nodes of the bigram PPTs contain the probability of the corresponding hypothesis times the probability for that node. For example, the probability of node [10] of FIG. 12B is 0.24, which is the bigram probability 0.4 from node [10] of FIG. 6 times the probability of 0.6 of the corresponding hypothesis. The CSR system builds the unigram PPT and the bigram PPTs in parallel as each phoneme is received. To generate the bigram PPTs, the CSR system uses the LEBPPT and the TND to identify what nodes to add and the probabilities for the nodes.

After the last phoneme is processed, the CSR system selects the best hypothesis as the sequence of words that best matches the phonemes. If the last phoneme has not yet been processed, then the CSR system selects starting with the first, the next unprocessed hypothesis as the next hypothesis.

Referring to FIG. 10, in step 1001, the system retrieves the next phoneme. In step 1002, if all the phonemes have already been processed, then the system continues at step 1010, else the system continues at step 1003. In step 1003, the system establishes a new hypothesis for the retrieved phoneme. In step 1004, if any new hypotheses have been established, then the system continues at step 1005, else the system skips to step 1007 to update the bigrams PPTs. In steps 1005–1009, the system instantiates a unigram PPT for the best hypothesis and a bigram PPT for each hypothesis. The system then sets the probabilities in the nodes of the PPTs based on the probability of the hypothesis and the unigram and bigram probabilities, the system loops updating the PPTs to reflect the state of the hypothesis. In step 1005, the system invokes the initialize interword bigram PPT routine, which initializes a bigram PPT for the transition from one word to the next. In step 1006, the system invokes the initialize interword unigram PPT routine, which initializes a unigram PPT for the transition from one word to the next. In steps 1007–1009, the routine loops updating the bigram PPTs unigram based on the phonemes. In step 1007, the system invokes the update bigram PPT to update the bigram PPT based on the phoneme. In step 1008, the system invokes the update unigram PPT routine. In step 1009, if the bigram PPT for each newly established hypothesis is complete, then the routine loops to step 1001, to select the next phoneme, else the routine loops to step 1007, to complete the updating of the PPTs. In step 1010, the system selects the best hypothesis as the recognized words for the retrieved sequence of phonemes and completes.

Figure 14:
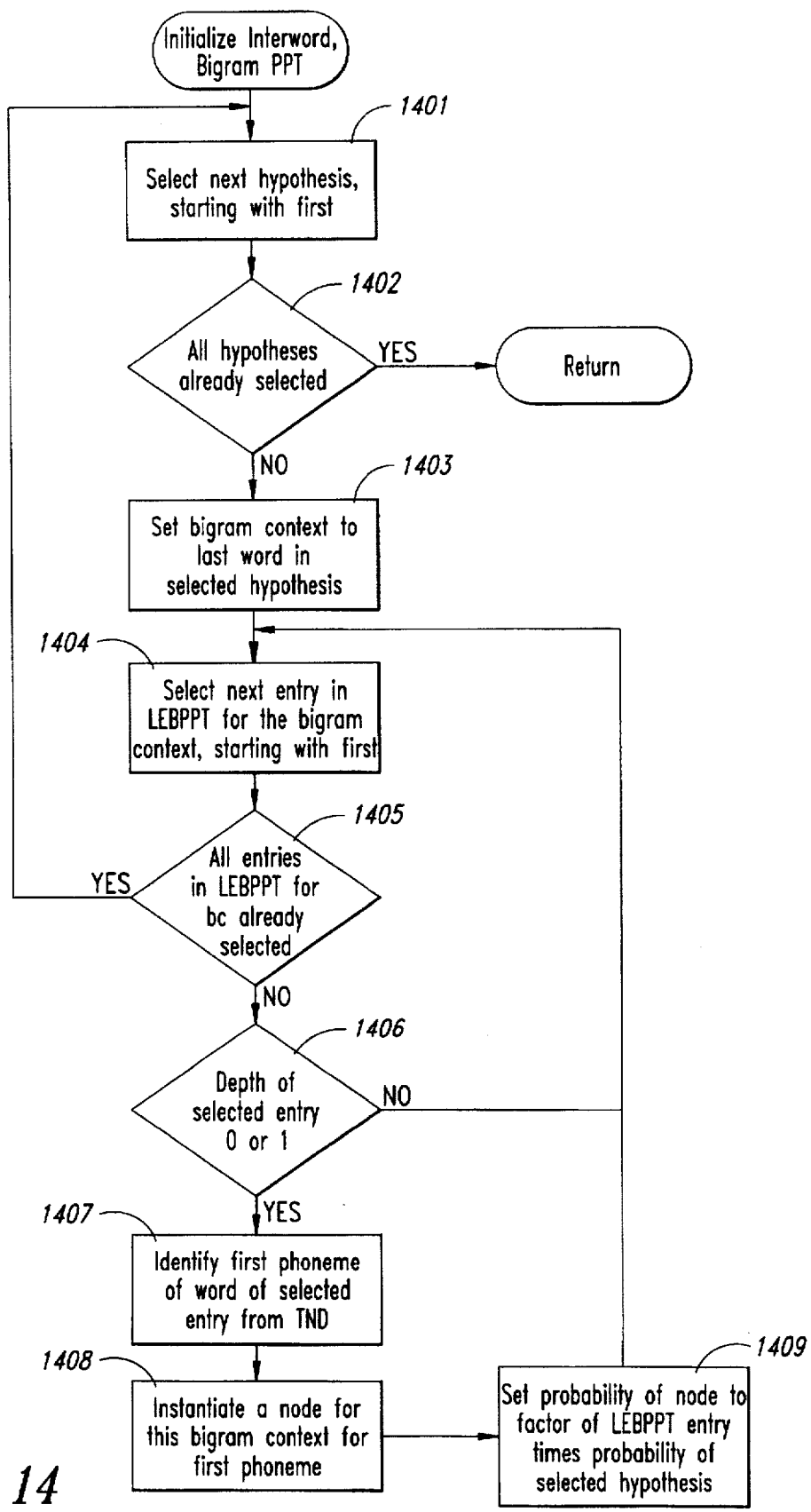
FIG. 14 is a flow diagram of the initialize interword bigram PPT routine.

FIG. 14 is a flow diagram of the initialize interword bigram PPT routine. This routine establishes a bigram context (i.e., a new bigram PPT) for the last word in each newly established hypothesis. This routine initializes the root node for each bigram context. In step 1401–1409, the routine loops selecting and processing each hypothesis. In step 1401, the routine selects the next hypothesis starting with the first. In step 1402, if all of the hypothesis have already been selected, then the routine returns, as the routine continues its step 1403. In step 1403, the routine sets the bigram context to the last word of the selected hypothesis. In step 1404–1409, the routine loops processing each LEBPPT entry for the designated bigram context. In step 1404, the routine selects the next entry in the LEBPPT for the selected bigram context starting with the first LEBPPT entry. In step 1405, if all of the LEBPPT entries for the bigram context have already been selected, the routine loops to step 1401 to select the next hypothesis, else the routine continues as step 1406. In step 1406, if the depth of the selected entry is zero or one, then the routine continues at step 1407, else the routine loops to step 1404 to select the next LEBPPT entry. In step 1407, the routine identifies the first phoneme of the word of the selected LEBPPT entry from the TND. In step 1408, the routine instantiates a node for this bigram context for the first phoneme in the word of the selected LEBPPT entry. In step 1409, the routine sets the probability of the node to the factor of the LEBPPT entry times the probability of the selected hypothesis and loops to step 1404 to select the next LEBPPT entry.

Figure 15:
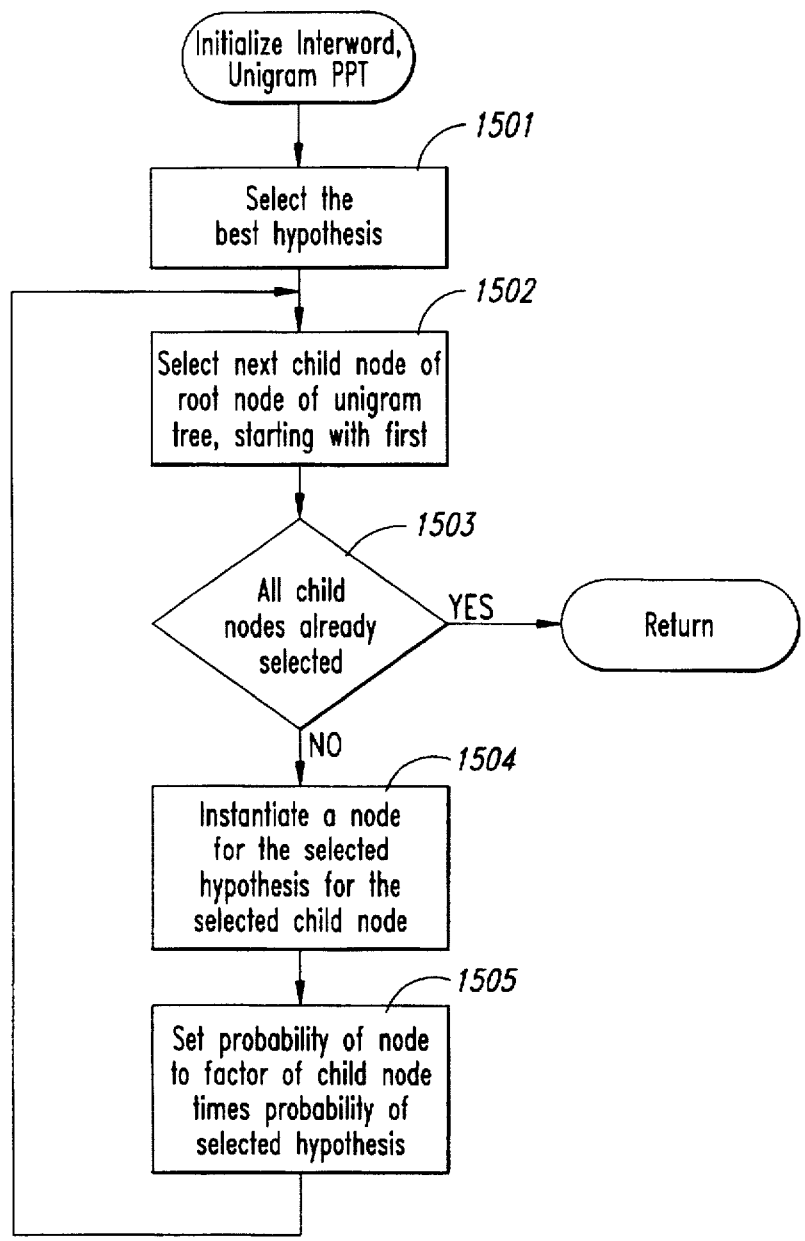
FIG. 15 is a flow diagram of the initialize interword unigram PPT routine.

FIG. 15 is a flow diagram of the initialize interword unigram PPT routine. This routine instantiates a unigram PPT for the hypothesis with the highest probability. The routine initializes a node for each child node of the root node of the unigram PPT. In step 1501, the routine selects the hypothesis with the highest probability. In steps 1502–1505, the routine instantiates a unigram context for each child node of the root node of the unigram PPT. In step 1502, the routine selects the next child node of the root node of the unigram PPT starting with the first. In step 1503, if all child nodes have already been selected, then the routine returns, else the routine continues at step 1504. In step 1504, the routine instantiates a node for the selected hypothesis for the selected child node. In step 1505, the routine sets the probability of the instantiated node to the factor of the child nodes times the probability of the selected hypothesis and loops to step 1502 to select the next child node of the root node.

Figure 16:
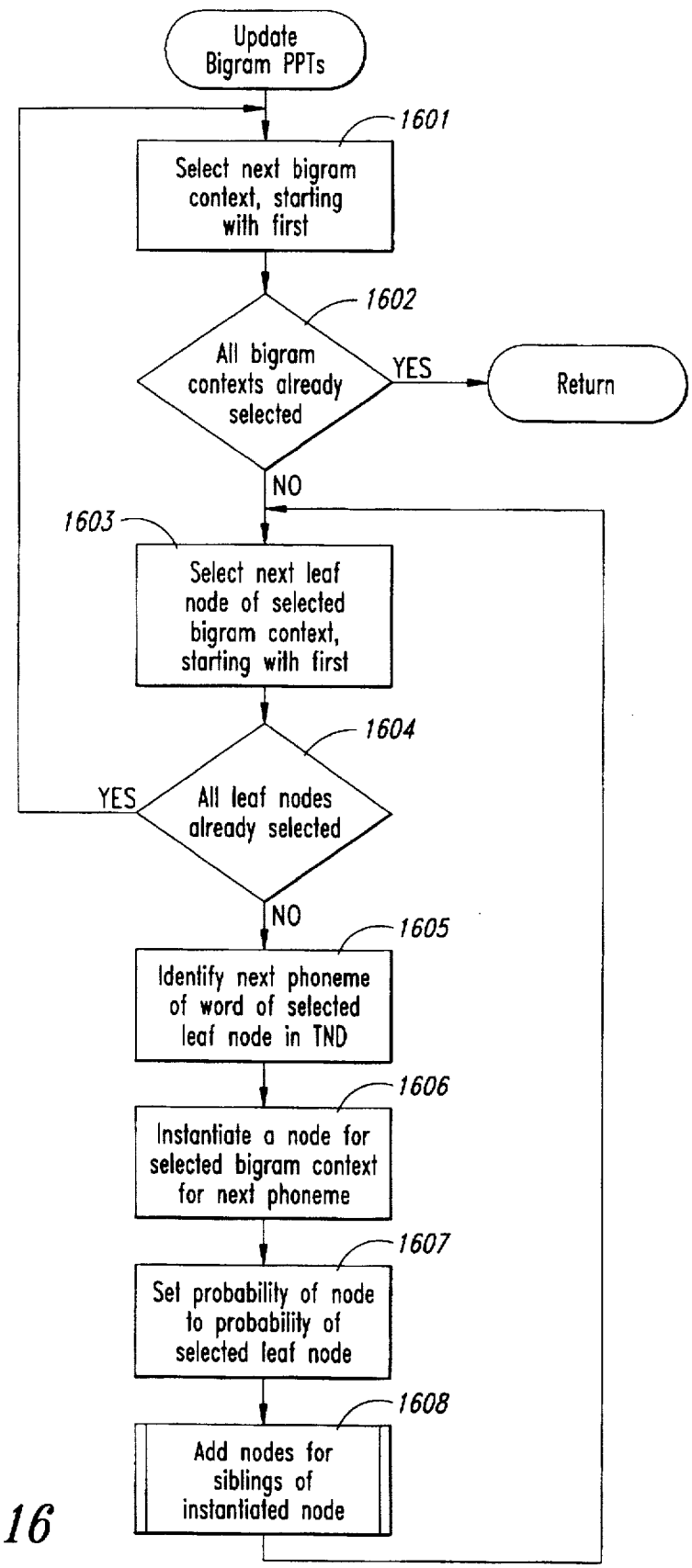
FIG. 16 is a flow diagram of the update bigram PPT routine.

FIG. 16 is a flow diagram of the update bigram PPT routine. In step 1601, the routine selects the next bigram context starting with the first. In step 1602, if all the bigram contexts have already been selected, then the routine returns, else the routine continues at step 1603. In step 1603–1608, the routine loops adding a child node to each leaf node of the bigram PPT for the selected bigram contexts. In step 1603, the routine selects the next leaf node for the bigram PPT starting with the first. In step 1604, if all the leaf nodes have already been selected, then the routine loops to step 1601 to select the next bigram context, else the routine continues at step 1605. In step 1605, the routine identifies the next phoneme of the word of the selected node in the TND. In step 1606, the routine instantiates a node for the bigram PPT of the selected bigram context for the next phoneme. In step 1607, the routine sets a probability of the instantiated node to the probability of the selected leaf node. In step 1608, the routine invokes a routine to add nodes for the siblings of the instantiated node and loops to step 1603 to select the next leaf node.

Figure 17:
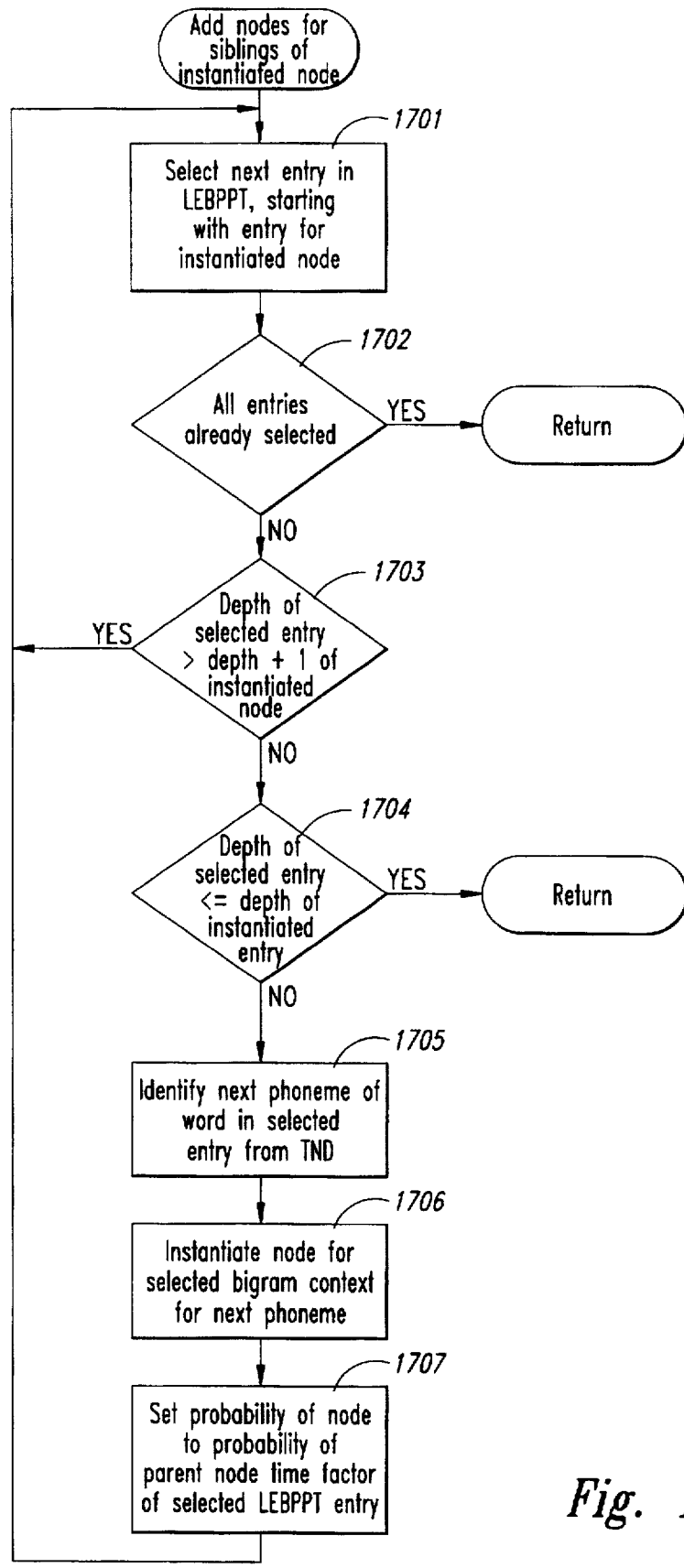
FIG. 17 is a flow diagram of the routine to add nodes for the sibling of the instantiated node.

FIG. 17 is a flow diagram of the routine to add nodes for the sibling of the instantiated node. In step 1701, the routine selects the next entry in the LEBPPT starting with the entry for the instantiated node. In step 1701, if all entries in the LEBPPT have already been selected, then the routine returns, else the routine continues at step 1703. In step 1703, if the depth of the selected LEBPPT entry is greater to than the depth plus one of the instantiated node, then the routine loops to step 1701 to select the next LEBPPT entry, else the routine continues at step 1704. In step 1704, if the depth of the selected entry is less than or equal to the depth of the instantiated node, then the routine returns, else the routine continues at step 1705. In step 1705, the routine identifies the next phoneme of the word in the selected LEBPPT entry from the TND. In step 1706, the routine instantiates a node for the bigram PPT of selected bigram context for the next phoneme. In step 1707, the routine sets the probability of the node to the probability of the parent node times the factor of the selected LEBPPT entry and loops to step 1701 to select the next LEBPPT entry.

Figure 18:
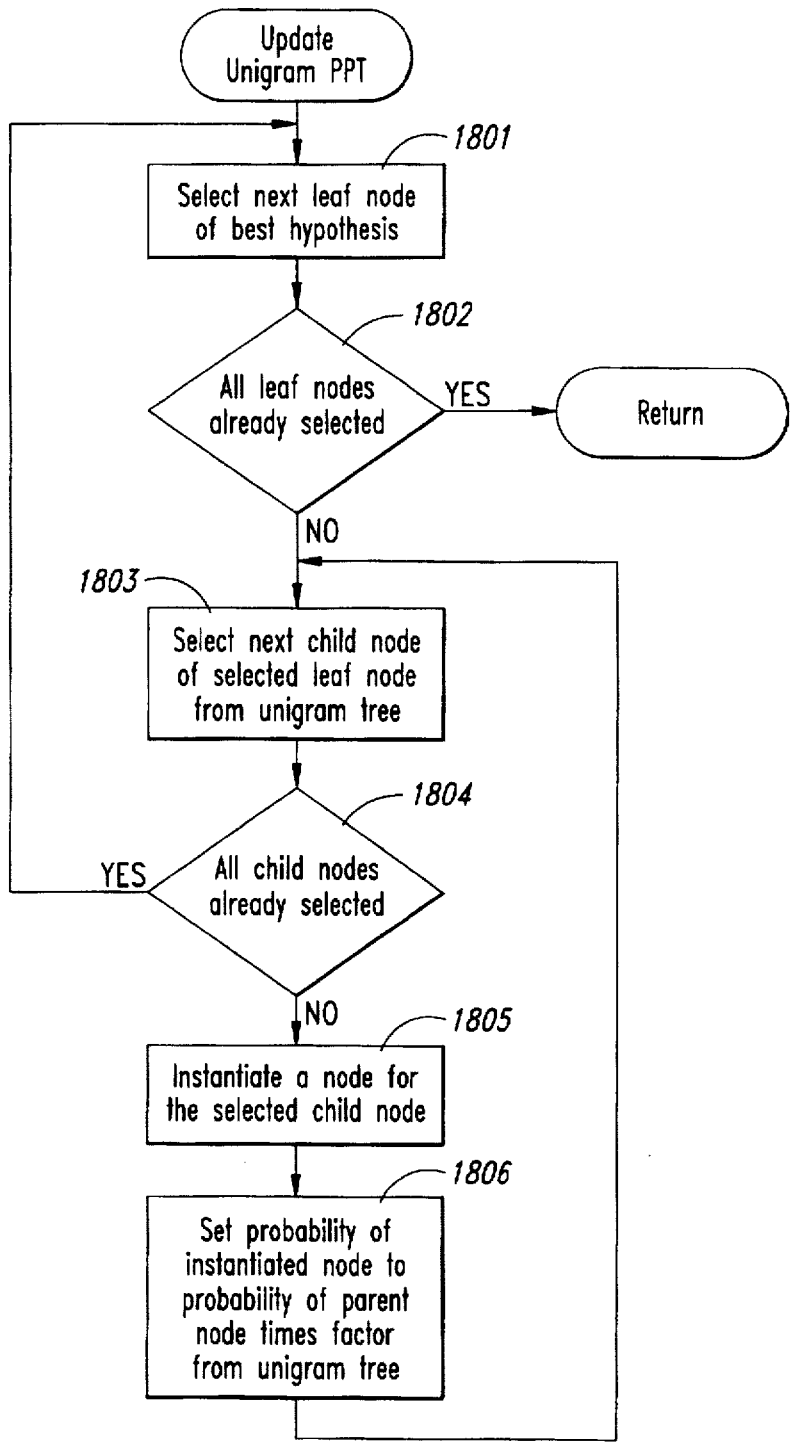
FIG. 18 is a flow diagram of the update unigram PPT routine.

FIG. 18 is a flow diagram of the update unigram PPT routine. In step 1801, the routine selects the next leaf node of the best hypothesis. In step 1802, if all of the leaf nodes of the best hypothesis have already been selected, then the routine returns, else the routine continues at step 1803. In step 1803 the routine instantiates nodes for each child node of the selected leaf node. In step 1803 the routine selects the next child node of the selected leaf node from the augmented unigram PPT. In step 1804, if all the child nodes have already been selected, then the routine loops to step 1801 to select the next leaf node, else the routine continues at step 1805. In step 1805, the routine instantiates a node for the selected child node. In step 1806, the routine selects the probability of the instantiated node to the probability of the parent node times the factor from the augmented unigram PPT and loops to step 1803 to select the next child node.

Although the present invention has been described in terms of a preferred embodiment, it is not intended that the invention be limited to this embodiment. Modifications within the spirit of the invention will be apparent to those skilled in the art. The scope of the present invention is defined that the claims that followed. In particular, the linear encoding techniques of the present invention can be used to encode tree data structures for a variety of applications not related to speech recognition. In general, the encoding techniques can be used as a generic mechanism for compactly representing tree data structures.

I claim:

1. A method in a computer system for encoding a pronunciation prefix tree, the pronunciation prefix tree having a plurality of nodes, each non-root and non-leaf node representing a phoneme, each leaf node representing a word formed by the phonemes represented by the non-leaf nodes in a path from the root node to the leaf node, each leaf node having a probability, the method comprising:

creating a tree node dictionary containing an indication of the phonemes that compose each word;

ordering child nodes of each non-leaf node of the pronunciation prefix tree based on the highest probability of descendent leaf nodes of the child node;

for each non-leaf node of the pronunciation prefix tree, setting the probability of the non-leaf node to a probability based on the probability of its child nodes;

for each node of the pronunciation prefix tree, setting a factor of the node to the probability of the node divided by the probability of a parent node of the node; and generating an encoded pronunciation entry for each leaf node of the pronunciation prefix tree, the encoded pronunciation entry indicating the word represented by the leaf node and containing the factor of a nearest ancestor node with a factor less than 1.0.

2. The method of claim 1 wherein child nodes of a node are ordered by probability such that the child node that has a descendent leaf node with the highest probability is left-most and wherein the generating of an encoded pronunciation entry for each leaf node of the pronunciation prefix tree includes performing a depth-first, left-to-right traversal of the pronunciation prefix tree.

3. The method of claim 1 wherein the creating of a tree node dictionary includes:

generating a unigram pronunciation prefix tree;

assigning a unique identifier to each node of the generated unigram pronunciations prefix tree; and for each word, storing the unique identifier for each node on the path from the root node to the leaf node representing that word.

4. The method of claim 3 wherein the assigning of unique identifiers assigns sequential identifiers to the nodes as visited in a breadth-first, left-to-right traversal of the unigram pronunciation prefix tree.

5. The method of claim 1 wherein the pronunciation prefix tree is a bigram pronunciation prefix tree.

6. The method of claim 1 wherein the pronunciation prefix tree is a trigram pronunciation prefix tree.

7. The method of claim 1 wherein the pronunciation prefix tree is an n-gram pronunciation prefix tree, where n is any length.

8. The method of claim 1 wherein the probability in each non-leaf node is set to the maximum probability of its child nodes.

9. The method of claim 1 wherein the probability in each non-leaf node is set to the sum of the probability of its child nodes.

10. The method of claim 1 wherein each node has a depth within the pronunciation prefix tree and wherein the encoded pronunciation entry contains the depth of the nearest ancestor node with a factor less 1.0.

11. A method in a computer system for linearly encoding a pronunciation prefix tree, the pronunciation prefix tree having a plurality of nodes, each non-root and non-leaf node representing a phoneme, each leaf node representing a word formed by the phonemes represented by the non-leaf nodes in a path from the root node to the leaf node, each leaf node having a probability, the method comprising:

setting a probability of each non-leaf node to a probability based on the probability of its child nodes;

setting a factor of each node to the probability of the node divided by the probability of the parent node of the node; and generating an encoded pronunciation entry for each leaf node of the pronunciation prefix tree, the encoded pronunciation entry indicating the word represented by the leaf node and containing the factor of a nearest ancestor node with a factor other than a predefined factor wherein the pronunciation prefix tree can be regenerated from the encoded pronunciation entries and a list of the phonemes that compose each word.

12. The method of claim 11 wherein child nodes of a node are ordered such that the child node that has a descendent leaf node with the highest probability is to the left of the other child nodes and wherein the generating of an encoded pronunciation entry for each leaf node of the pronunciation prefix tree includes performing a depth-first, left-to-right traversal of the pronunciation prefix tree.

13. The method of claim 11, including creating of a tree node dictionary by:

generating a unigram pronunciation prefix tree;

assigning a unique identifier to each node of the generated unigram pronunciation prefix tree; and for each word, storing the unique identifier for each node on the path from the root node of the unigram pronunciation prefix tree to the leaf node representing that word.

14. The method of claim 13 wherein the assigning of unique identifiers assigns sequential identifiers to the nodes as visited in a breadth-first, left-to-right traversal of the unigram pronunciation prefix tree.

15. The method of claim 11 wherein the pronunciation prefix tree is a bigram pronunciation prefix tree.

16. The method of claim 11 wherein the pronunciation prefix tree is a trigram pronunciation prefix tree.

17. The method of claim 11 wherein the pronunciation prefix tree is an n-gram pronunciation prefix tree, where n is any length.

18. The method of claim 11 wherein the probability in each non-leaf node is set to the maximum probability of its child nodes.

19. The method of claim 11 wherein the probability in each non-leaf node is set to the sum of the probability of its child nodes.

20. The method of claim 11 wherein each node has a depth within the pronunciation prefix tree and wherein the encoded pronunciation entry contains the depth of the nearest ancestor node with a factor less than 1.0.

21. The method of claim 11 wherein the predefined factor is 1.0.

22. A method in a computer system for decoding a linearly encoded pronunciation prefix tree into a pronunciation prefix tree, the linearly encode pronunciation prefix tree having an entries, each entry corresponding to a word and having a factor of a nearest ancestor node with a factor less than 1.0 in the pronunciation prefix tree, the linear encoded pronunciation prefix tree having an associated listing of the phonemes of each word, the method comprising:

for each entry,
  selecting the entry;
  retrieving the list of the phonemes of the word of the selected entry;
  adding a node to the pronunciation prefix tree corresponding to each phoneme in the retrieved list for which a node has not already been added; and
  setting the probability in each added node to the same probability that is the factor of the entry times the probability of the closest common ancestor node of the added nodes.

23. The method of claim 22 wherein each node has a depth within the pronunciation prefix tree, wherein the entry contains the depth of the nearest ancestor node with a factor less than 1.0, and wherein when adding a node corresponding to each phoneme in the retrieved list, using the depth of the entry to indicate the depth of the first node to add.

24. The method of claim 22 wherein the pronunciation prefix tree is a bigram pronunciation prefix tree.

25. The method of claim 22 wherein the pronunciation prefix tree is a trigram pronunciation prefix tree.

26. The method of claim 22 wherein the pronunciation prefix tree is an n-gram pronunciation prefix tree, where n is any length.

27. The method of claim 22 wherein each node has a depth within the pronunciation prefix tree, wherein the entry contains the depth of the nearest ancestor node with a factor less than 1.0, and wherein the setting of the probability in each node includes setting the factor in the added node at the depth of the entry to the factor of the entry and the factor each other added node to 1.0.

28. The method of claim 22, including calculating the probability by multiplying the factor in each node by the probability in a parent node of the node.

29. A method in a computer system for linearly encoding a tree, the tree having a plurality of nodes, the tree having a root node and leaf nodes, each leaf node having a value, the method comprising:

for each leaf node, generating a list of an identification of the nodes in a path from the root node to the leaf node;
setting a value of each non-leaf node to a value based on the value of its child nodes;
setting a factor of each node to the value of the node divided by the value of a parent node of the node; and
generating an encoded entry for each leaf node of the tree, the encoded entry identifying the leaf node and containing the factor of a nearest ancestor node with a factor other than a predefined factor.

30. The method of claim 29 wherein the tree can be regenerated from the encoded entries and the lists of the nodes in the paths.

31. The method of claim 29 wherein each node has a depth within the tree and wherein the encoded entry contains the depth of the nearest ancestor node with a factor less than 1.0.

32. The method of claim 31, including after generating the encoded entries, identifying the nodes at a certain depth within the tree by, for each encoded entry, selecting the identification of the node at the certain depth in the list for the leaf node identified by the encoded entry.

33. The method of claim 32 wherein the certain depth is used as an index into the list.

34. The method of claim 32 wherein the tree is a bigram pronunciation prefix tree and the identifying of the nodes at a certain depth is performed during recognition of a sequence of phonemes.

35. The method of claim 29 wherein the tree is a pronunciation prefix tree.

36. A computer-readable medium containing instructions for causing a computer system to encode a pronunciation prefix tree, the pronunciation prefix tree having a plurality of nodes representing phonemes that compose words, each leaf node having a probability, by:

for each leaf node, generating a list of phonemes that compose the words;
setting a probability of each non-leaf node to a probability based on the probability of its child nodes;
setting a factor of each node to the probability of the node divided by the probability of a parent node of the node; and
generating an encoded pronunciation entry for each leaf node of the pronunciation prefix tree, the encoded pronunciation entry indicating the word represented by the leaf node and containing the factor of a nearest ancestor node with a factor other than a predefined factor.

37. The computer-readable medium of claim 36 wherein child nodes of a node are ordered such that the child node that has a descendent leaf node with the highest probability is to the left of the other child nodes and wherein the generating of an encoded pronunciation entry for each leaf node of s the pronunciation prefix tree includes performing a depth-first, left-to-right traversal of the pronunciation prefix tree.

38. The computer-readable medium of claim 36, including generating the list of phonemes by:

generating a unigram pronunciation prefix tree;
assigning a unique identifier to each node of the generated unigram pronunciation prefix tree; and
for each word, storing the unique identifier for each node on the path from the root node of the unigram pronunciation prefix tree to the leaf node representing that word.

39. The computer-readable medium of claim 36 wherein the assigning of unique identifiers assigns sequential identifiers to the nodes as visited in a breadth-first, left-to-right traversal of the unigram pronunciation prefix tree.

40. The computer-readable medium of claim 36 wherein the pronunciation prefix tree is a bigram pronunciation prefix tree.

41. The computer-readable medium of claim 36 wherein the pronunciation prefix tree is a trigram pronunciation prefix tree.

42. The computer-readable medium of claim 36 wherein the pronunciation prefix tree is an n-gram pronunciation prefix tree, where n is any length.

43. The computer-readable medium of claim 36 wherein the probability in each non-leaf node is set to the maximum probability of its child nodes.

44. The computer-readable medium of claim 36 wherein the probability in each non-leaf node is set to the sum of the probability of its child nodes.

45. The computer-readable medium of claim 36 wherein each node has a depth within the pronunciation prefix tree and wherein the encoded pronunciation entry contains the depth of the nearest ancestor node with a factor less than 1.0.

46. The computer-readable medium of claim 36 wherein the predefined factor is 1.0.

47. A computer system for encoding a tree, the tree having a plurality of nodes, the tree having a root node and leaf nodes, each leaf node having a value, the computer system comprising:

a path listing with an identification of the nodes of each path from a root node to a leaf node;

means for setting a factor of each node to a value of the node divided by a value of the parent node of the node; and means for generating an encoded entry for each leaf node of the tree, the encoded entry identifying the leaf node and containing the factor of a nearest ancestor node with a factor other than a predefined factor.

48. The computer system of claim 47 wherein the tree can be regenerated from the encoded entries and the path listings.

49. The computer system of claim 47 wherein each node has a depth within the tree and wherein the encoded entry contains the depth of the nearest ancestor node with a factor less than 1.0.

50. The method of claim 49, including means for, after generating the encoded entries, identifying the nodes at a certain depth within the tree by, for each encoded entry, selecting the identification of the node at the certain depth in the list for the leaf node identified by the encoded entry.

51. The computer system of claim 50 wherein the certain depth is used as an index into the list.

52. The computer system of claim 50 wherein the tree is a bigram pronunciation prefix tree and the identifying of the nodes at a certain depth is performed during recognition of a sequence of phonemes.

53. The computer system of claim 47 wherein the tree is a pronunciation prefix tree.

54. A computer system for recognizing speech comprising:

a linear encoder for linearly encoding a pronunciation prefix tree;

a phoneme recognizer for receiving speech to be recognized and identifying phonemes that compose the received speech; and recognizer for identifying the words which the identified phonemes correspond using probabilities encoded in the linearly encoded pronunciation prefix tree.

55. The computer system of claim 54 wherein the pronunciation prefix tree has plurality of nodes, each non-root and non-leaf node representing a phoneme, each leaf node representing a word formed by the phonemes represented by the non-leaf nodes in a path from the root node to the leaf node, each leaf node having a probability, by:

setting a probability of each non-leaf node to a probability based on the probability of its child nodes;

setting a factor of each node to the probability of the node divided by the probability of the parent node of the node; and generating an encoded pronunciation entry for each leaf node of the pronunciation prefix tree, the encoded pronunciation entry indicating the word represented by the leaf node and containing the factor of a nearest ancestor node with a factor other than a predefined factor.

56. The computer system of claim 55 wherein child nodes of a node are ordered such that the child node that has a descendent leaf node with the highest probability is to the left of the other child nodes and wherein the generating of an encoded pronunciation entry for each leaf node of the pronunciation prefix tree includes performing a depth-first, left-to-right traversal of the pronunciation prefix tree.

57. The computer system of claim 55 wherein the linear encoder creates a tree node dictionary by:

generating a unigram pronunciation prefix tree;

assigning a unique identifier to each node of the generated unigram pronunciation prefix tree; and for each word, storing the unique identifier for each node on the path from the root node of the unigram pronunciation prefix tree to the leaf node representing that word.

58. The computer system of claim 57 wherein the assigning of unique identifiers assigns sequential identifiers to the nodes as visited in a breadth-first, left-to-right traversal of the unigram pronunciation prefix tree.

59. The computer system of claim 55 wherein the pronunciation prefix tree is a bigram pronunciation prefix tree.

60. The computer system of claim 55 wherein the pronunciation prefix tree is a trigram pronunciation prefix tree.

61. The computer system of claim 55 wherein the pronunciation prefix tree is an n-gram pronunciation prefix tree, where n is any length.

62. The computer system of claim 55 wherein the probability in each non-leaf node is set to the maximum probability of its child nodes.

63. The computer system of claim 55 wherein the probability in each non-leaf node is set to the sum of the probability of its child nodes.

64. The computer system of claim 55 wherein each node has a depth within the pronunciation prefix tree and wherein the encoded pronunciation entry contains the depth of the nearest ancestor node with a factor less than 1.0.

65. The computer system of claim 55 wherein the predefined factor is 1.0.

* * * * *